(12) United States Patent
Faulring

(10) Patent No.: US 8,122,838 B2
(45) Date of Patent: Feb. 28, 2012

(54) TRANSPLANTER

(75) Inventor: Frank W. Faulring, North Collins, NY (US)

(73) Assignees: Faulring Mechanical Devices, Inc., North Collins, NY (US); Morning Star Company, Woodland, CA (US)

( * ) Notice: Subject to any disclaimer, the term of this patent is extended or adjusted under 35 U.S.C. 154(b) by 0 days.

(21) Appl. No.: 13/045,256

(22) Filed: Mar. 10, 2011

(65) Prior Publication Data
US 2011/0179982 A1 Jul. 28, 2011

Related U.S. Application Data

(62) Division of application No. 12/221,081, filed on Jul. 31, 2008.

(60) Provisional application No. 60/963,645, filed on Aug. 4, 2007, provisional application No. 60/998,329, filed on Oct. 10, 2007, provisional application No. 61/067,575, filed on Feb. 29, 2008.

(51) Int. Cl.
*A01C 11/00* (2006.01)

(52) U.S. Cl. ........................................ 111/105; 111/919

(58) Field of Classification Search .......... 111/100–117, 111/200, 900, 919, 921, 922
See application file for complete search history.

(56) References Cited

U.S. PATENT DOCUMENTS

| | | | |
|---|---|---|---|
| 2,348,787 A | 5/1944 | Cordes | |
| 2,475,078 A | 7/1949 | Cherry | |
| 2,784,997 A | 3/1957 | Baumann | |
| 3,524,419 A | 8/1970 | Middleton et al. | |
| 3,712,252 A | 1/1973 | Huang | |
| 3,826,382 A | 7/1974 | Zappia | |
| 4,455,950 A | 6/1984 | Pretzer | |
| 4,616,578 A | 10/1986 | Talbott | |
| 4,644,880 A | 2/1987 | Branch | |
| 4,709,536 A | 12/1987 | Hartness et al. | |
| 4,750,439 A | 6/1988 | deGroot | |
| 4,835,946 A | 6/1989 | Hartness et al. | |
| 4,854,802 A | 8/1989 | deGroot | |
| 4,869,637 A | 9/1989 | DeGroot | |
| 4,893,571 A | 1/1990 | Hakli et al. | |
| 4,970,972 A | 11/1990 | Williames | |
| 5,035,105 A | 7/1991 | Qvarnstrom | |
| 5,160,235 A | 11/1992 | Bikow | |
| 5,209,170 A | 5/1993 | Kobayashi | |
| 5,431,116 A | 7/1995 | Gao | |

(Continued)

FOREIGN PATENT DOCUMENTS

DE 1143359 B 2/1963

(Continued)

*Primary Examiner* — Christopher J. Novosad
(74) *Attorney, Agent, or Firm* — John C. Thompson; Sandra J. Thompson

(57) ABSTRACT

Transplanter which can avoid skips when planting, which skips may occur when seeds in a tray row fail to grow into seedlings. This is accomplished by picking up an entire row of seedlings from a tray, transferring the seedlings to a mechanism which eliminates gaps between seedlings, and then discharging the seedlings one at time to the ground with a desired spacing between the seedlings. A novel tray indexing mechanism is provided which can index trays of varying sizes. The planting mechanism has an air knife mounted adjacent transfer disks for straightening out the foliage as stems of seedlings before they are received by the planting disks, and the planting and transfer disks may be moved towards and away from each other for seedlings of differing heights.

4 Claims, 40 Drawing Sheets

U.S. PATENT DOCUMENTS

| | | |
|---|---|---|
| 5,488,802 A | 2/1996 | Williames |
| 5,557,881 A | 9/1996 | Bouldin et al. |
| 5,573,558 A | 11/1996 | Huang |
| 5,577,453 A | 11/1996 | Lucht |
| 5,676,072 A | 10/1997 | Williames |
| 5,765,491 A | 6/1998 | Brower et al. |
| 5,823,126 A | 10/1998 | Kolk et al. |
| 5,860,372 A | 1/1999 | Bouldin et al. |
| 5,911,631 A | 6/1999 | Bouldin et al. |
| 6,073,564 A | 6/2000 | Keskilohko |
| 6,080,951 A * | 6/2000 | Thijssen et al. ............... 209/577 |
| 6,212,821 B1 | 4/2001 | Adam et al. |
| 6,327,986 B1 | 12/2001 | Williames |
| 6,591,766 B2 | 7/2003 | Williames |
| 6,634,306 B1 | 10/2003 | Faulring |
| 7,036,440 B1 | 5/2006 | Sena |
| 7,051,475 B1 | 5/2006 | Sena |
| 7,363,868 B1 | 4/2008 | Sena |

FOREIGN PATENT DOCUMENTS

| | | |
|---|---|---|
| EP | 0286624 A | 10/1988 |
| EP | 0390269 A | 10/1990 |
| WO | WO 87/04585 | 8/1987 |

* cited by examiner

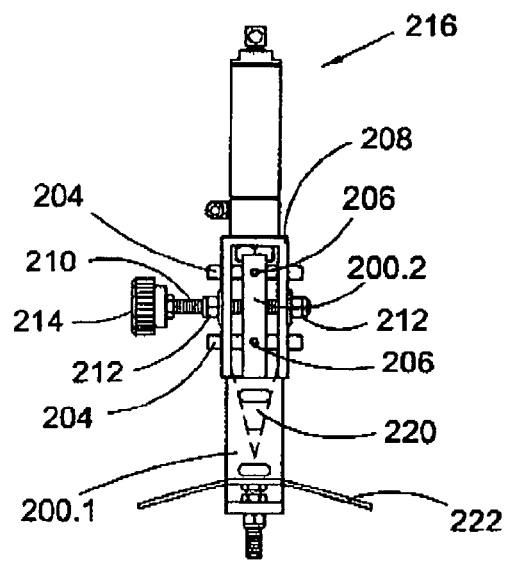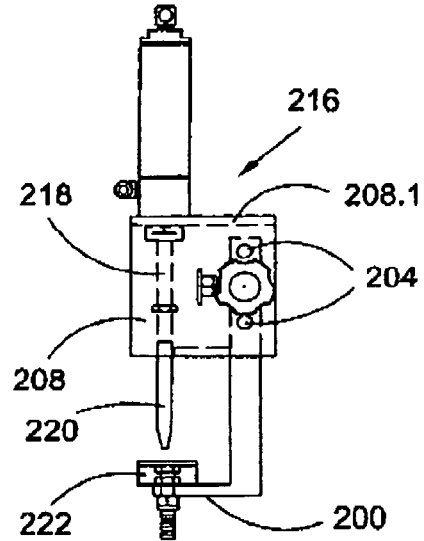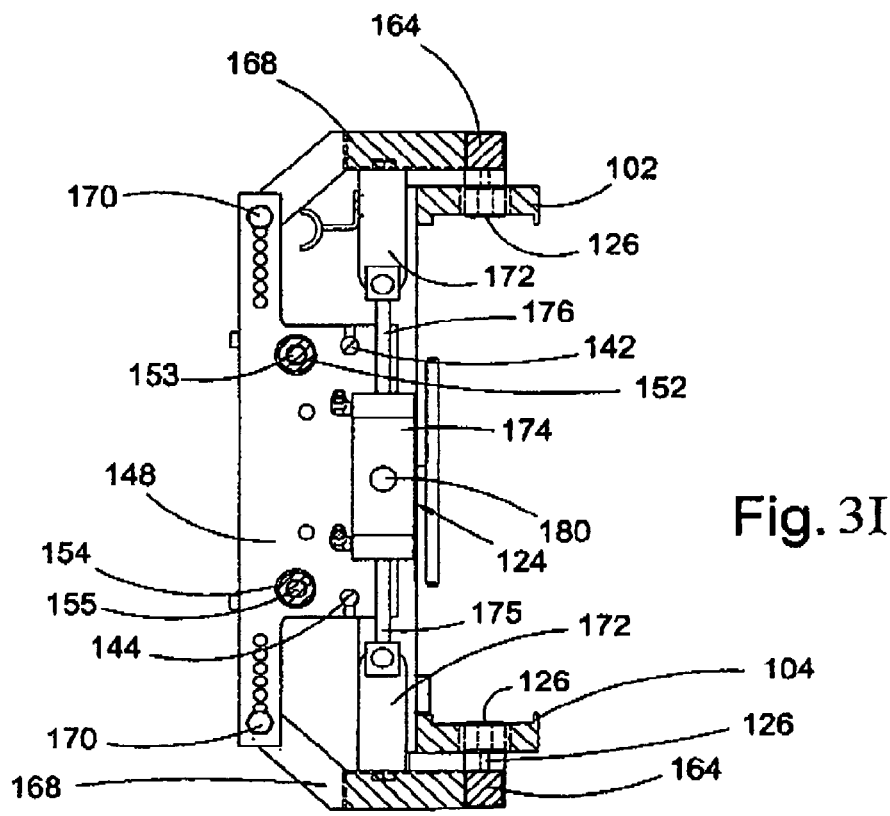
Fig. 3G  Fig. 3H
Fig. 3I

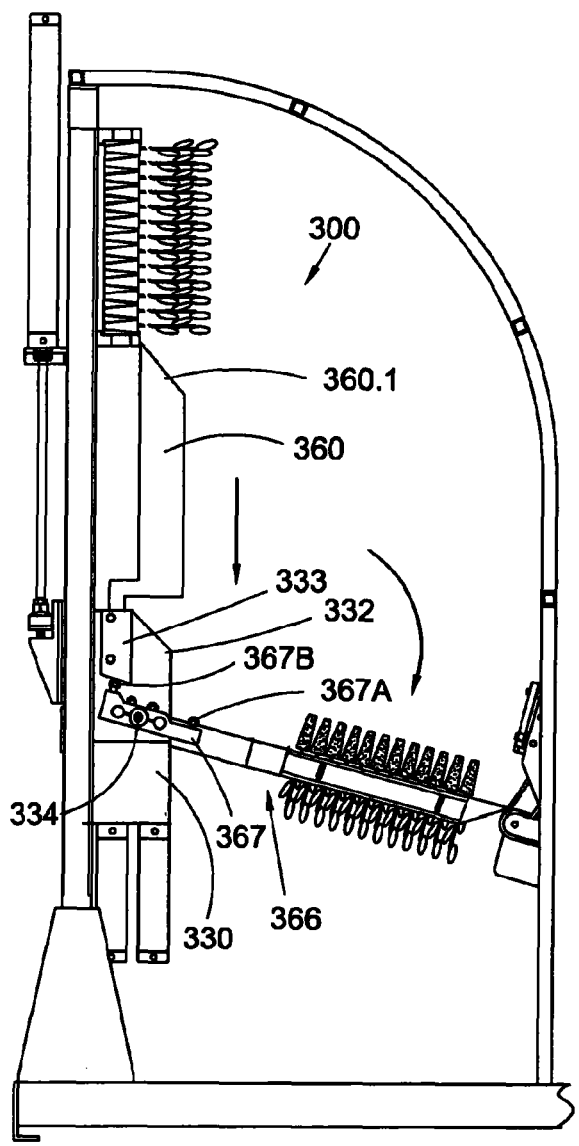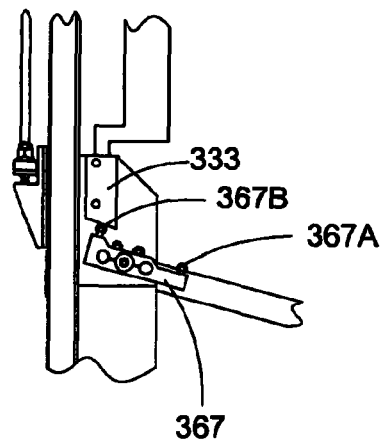
Fig. 7A
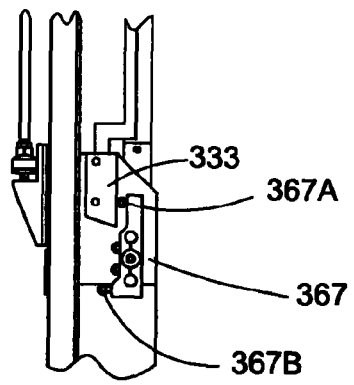
Fig. 7B
Fig. 7

Fig. 13A                    Fig. 13B

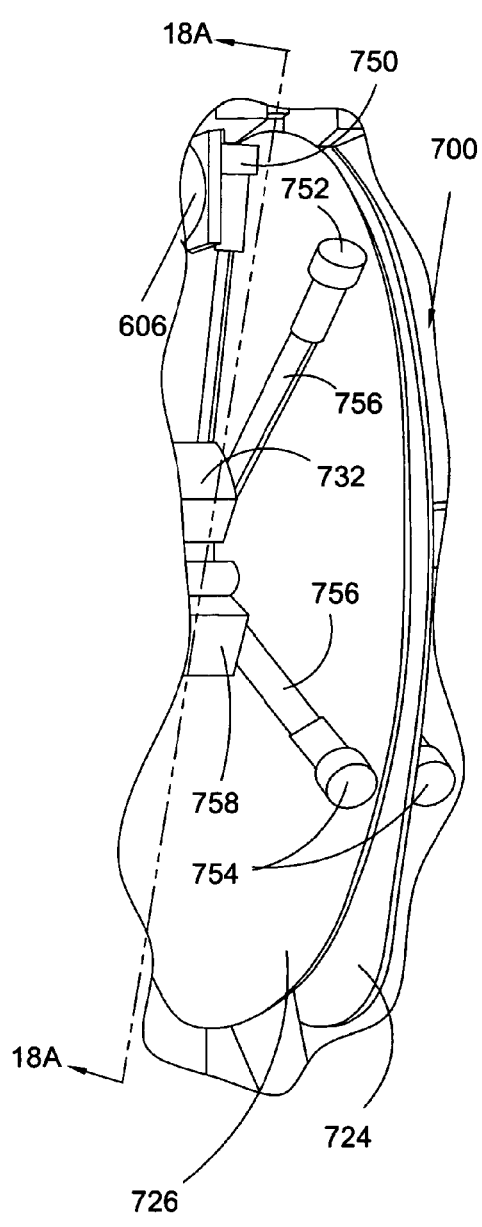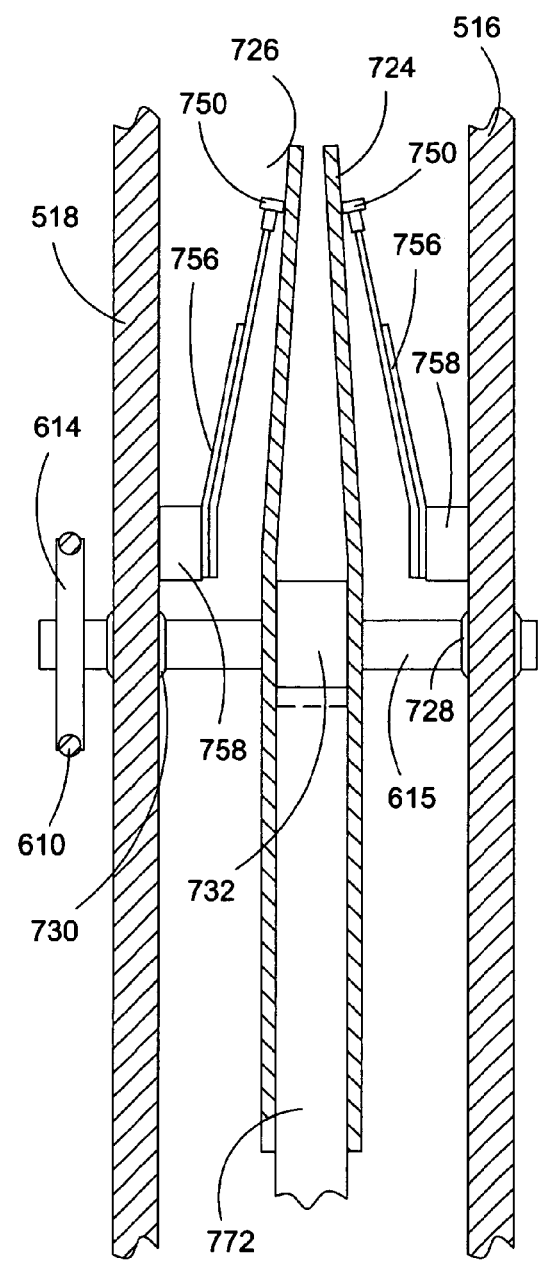
Fig. 18
Fig. 18A

Reload Execution Loop

TRANSPLANTER

CROSS-REFERENCE TO RELATED APPLICATIONS

This application claims the benefit under 35 U.S.C. §119 (e) of U.S. provisional patent applications Ser. No. 60/963,645, filed Aug. 4, 2007, Ser. No. 60/998,329, filed Oct. 10, 2007, and Ser. No. 61/067,575, filed Feb. 29, 2008. In addition, this application is a divisional application of U.S. application Ser. No. 12/221,081 filed Jul. 31, 2008.

TECHNICAL FIELD

The present invention relates generally to transplanters, and more particularly to one which can avoid skips when planting which may occur when seeds in a tray row fail to grow into seedlings. This is accomplished by picking up an entire row of seedlings from a tray, transferring the seedlings to a mechanism which eliminates gaps between seedlings, and then discharging the seedlings one at time to the ground with a desired spacing between the seedlings.

BACKGROUND OF THE INVENTION

Transplanters are well known in the art. U.S. Pat. No. 6,327,986 discloses an apparatus for transplanting seedlings from nursery trays. This approach utilizes a specially designed tray with grooves evenly spaced across the tray top for a sprocket-type element to engage and incrementally advance the tray one row at a time into the extraction area. At the extraction area, a row of plunger devices engage the tray and push one row of plants at a time from the tray into an endless belt equipped with a series of chambers that are matched to the same pitch center of the tray. After extraction, the loaded root ball chambers and belt assembly are rotated 90° from the face of the tray. The plants are then discharged, one at a time, into a series of interlocks that convey the plants to the ground engaging row unit. Along the way, three separate sets of sensors look for plant skips and advance the root ball chamber belt assembly one cell to make up for skips and eject the deficient root ball at the same time.

U.S. Pat. No. 6,080,951 discloses another approach to overcome the seedling tray skip problem. This concept utilizes a system, whereby two sets of plungers and extractors remove plants simultaneously from a plant tray. On a 10 cell tray, the first extractor would be positioned at the No. 1 cell and the second at the No. 6 cell. After extraction, the plants are dropped into two separate gated chambers and sensors confirm that plants are present. In normal operation, the plants would discharge sequentially from each chamber. If a skip is detected, the deficient root ball would be discarded and the other root ball would be planted in its place.

These approaches rely heavily on the accuracy of detectors to sense the presence of plant foliage. Considering the chaotic nature of the foliage and the necessary speed to be efficient, there is substantial room for error in these systems. Our system, by nature of its design, has no sensors, no extra extraction points or extra mechanics. All the tray skips are overcome by the belts pushing together the root balls of the rows of plants extracted from a plant tray.

Other transplanters which transplant from a plant tray are shown in U.S. Pat. Nos. 4,644,880; 5,431,116; 5,573,558; 5,676,072; 6,073,564; and 6,634,306.

OBJECTS AND SUMMARY OF THE INVENTION

It is an object of this invention to provide a method for transplanting seedlings grown in trays having a plurality of side-by side rows of seedling cells, which method plants the seedlings uniformly apart even though not all cells have seedlings. The method includes the steps of picking up an entire row of seedlings from a tray, which row may have gaps between seedlings, transferring the seedlings to a mechanism which eliminates gaps between seedlings, and then discharging the seedlings one at time to the ground with a desired spacing between the seedlings. The seedlings have a root ball, stem, and leaves or foliage.

It is a further object of this invention to provide an apparatus for transplanting seedlings grown in trays having a plurality of side-by side rows of seedling cells, which apparatus plants the seedlings uniformly apart even though not all cells have seedlings, the apparatus including means for picking up an entire row of seedlings from a tray, means for eliminating gaps between seedlings, and means for discharging the seedlings one at time to the ground with a desired spacing between the seedlings.

It is a further object of this invention picking up an entire row of seedlings from a tray by engaging the stems of the seedlings, which row in the tray may have gaps between seedlings; to transfer the seedlings to a mechanism which eliminates gaps between seedlings; to discharge the seedlings one at time from the gap eliminating mechanism with a desired spacing between the seedlings; and toplant the seedlings uniformly apart in the ground.

It is another object of the present invention to provide a transplanter which discharges seedlings one at time to the ground with a desired spacing between the seedlings, the transplanter having an improved planter assembly having a forward pair of transfer disks; a rear pair of planter disks; and an air knife mounted adjacent the forward pair of transfer disks for extending the stem and foliage of a seedling while in the forward pair of transfer disks for proper engagement by the rear pair of planting disks.

It is yet another object of the present invention to a transplanter which discharges seedlings one at time to the ground with a desired spacing between the seedlings, the transplanter having an improved plant feeder subassembly including a forward pair of transfer disks; a rear pair of planter disks; and means for moving the pairs of disks towards and away from each other to accommodate differing seedling heights.

A further object of the present invention is to provide a nursery tray indexing mechanism for use in a transplanter which discharges seedlings one at time to the ground with a desired spacing between the seedlings, which transplanter picks up an entire row of seedlings from a tray, which indexing mechanism is capable of receiving nursery trays of differing depths, widths, lengths and spacings between adjacent rows of cells, the indexing mechanism having top and bottom holding rails for slidably receiving and holding nursery trays; means for indexing the tray a distance approximately the width of a nursery tray cell; and means to finally position the tray by engaging a cell.

Our approach utilizes a series of rubber grippers that engage the edge of the tray and advance the tray a distance approximately the width of one cell. Then a cone-shaped or V-shaped tray locking device engages an adjacent cell and accurately locates the cells to the proper location. This concept eliminates the need for special trays and retains the precision accuracy of indexing. When changing to different cell-sized trays, the position of the tray locking device is the only adjustment necessary.

To extract a row of plants, a spear device is utilized which penetrates across the top of the tray, capturing a row of plants by their stems. A bladder tube is then inflated, pinching the stems between the spears. With the tray in a vertical position, the spear extracts one row of plants and rotates down. This concept eliminates the need to engage the tray, thereby eliminating unnecessary sophistication and accuracy needed in the plunger type concept. Extracting the plants by gripping the stems and leaves of a root ball is much less invasive to the root ball, whereas the plunger concept compresses and damages the end of the root ball extensively. With the spear extraction concept, all the deficient root balls are left in the tray.

For gap-up of skips, the row of inverted plants is placed on a pair of gap-up belts that run faster than the discharge rate, thereby pushing up any skips in the row of plants. No electronics and no sensors are needed in this configuration, thereby increasing the accuracy and reducing any unnecessary sophistication of the system.

BRIEF DESCRIPTION OF THE FIGURES

In the following views right hand and left hand reference is determined by standing behind the transplanter and facing its direction of travel. In addition, for convenience, front and rear references are applicable to a single row transplanter as shown in FIG. 1A.

FIGS. 3G and 3H are enlarged top and side views of the tray positioning lock assembly shown in FIGS. 3E and 3F.

FIG. 3I is a sectional view taken generally along the line 3I-3I in FIG. 3B.

FIG. 7 is a left side elevational view similar to FIG. 6A, but showing the pivotal seedling extraction spears in their fully lowered position, and with the foliage spears moved to their lower position.

FIGS. 7A and 7B are details of a portion of FIG. 7 showing the adjustable stops in contact with the stop abutment when the seedling extraction spears are in their lower position in FIG. 7A and in their upper position in FIG. 7B.

FIGS. 13A and 13B are front elevational views showing the root-ball loaders in their open and closed positions, respectively.

FIG. 18 is a perspective view of a portion of the discharge mechanism.

DETAILED DESCRIPTION IN GENERAL

Figure 1A:
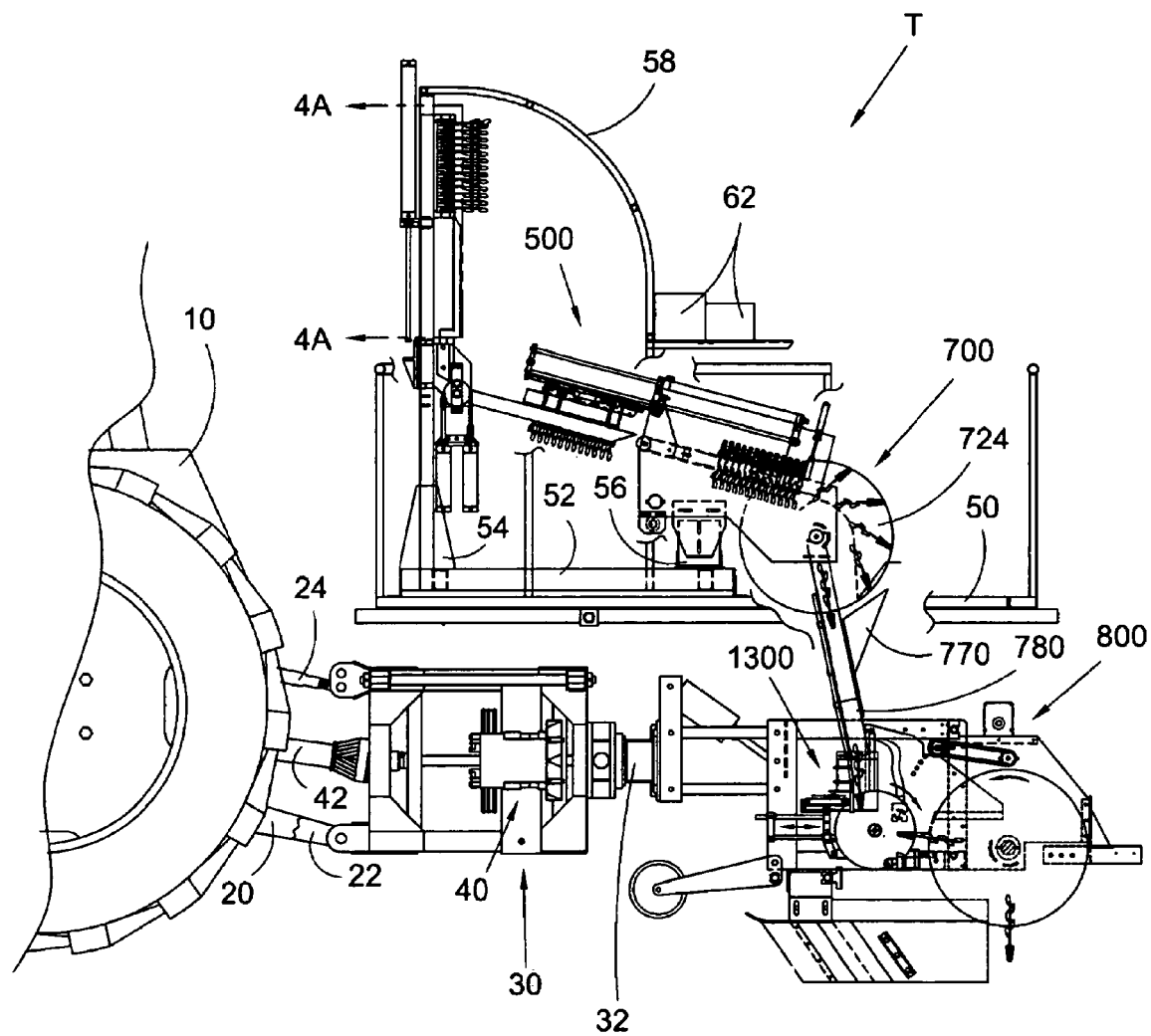
FIG. 1A is a left side elevational view of a one row transplanter of this invention mounted behind a tractor, this view showing the mechanism for picking up an entire row of seedlings from a tray, transferring the seedlings to a mechanism which eliminates gaps between seedlings, a discharge mechanism for dropping individual seedlings into a drop tube, and a planter subassembly which incorporates a plant feeder subassembly for discharging the seedlings one at time to the ground with a desired spacing between the seedlings, some parts not being illustrated.

The transplanter of this invention is indicated generally at "T" in FIG. 1. It may be semi-integrally mounted on the three point hitch 20, 22, 24 of a tractor 10, only a portion of which is shown in FIG. 1. A box-like subframe indicated generally at 30 is in turn carried by the three point hitch. Mounted on the back of the subframe 30 is a tool bar 32 which in turn carries wheels 34, 36 shown only in FIG. 2A. Each of the wheels is carried by a pivoted sub-frame (not shown) which is in turn pivotally secured to the tool bar. Each of the wheels may be moved up and down. As this design is conventional, it is not illustrated.

Mounted on the sub-frame 30 is high volume air compressor indicated generally at 40 and also, but not shown, a high pressure air compressor, a 24 volt alternator, and a 24 volt battery source, the compressors and alternator being powered by the PTO shaft 42 of the tractor. The air discharged by the air high pressure compressor provides the power required by the various air motors on the transplanter, and the air from the high volume compressor is used by air knifes and to assist flow through the drop tube.

The transplanter includes an operator support or platform 50. Mounted on the operator support 50 is a horizontal transplanter subframe 52. This in turn carries front and rear vertical subframe assemblies indicated generally at 54 and 56, respectively. An arched subframe 58 extends from the top of the vertical subframe 54 downwardly and to the back to a location in front of the rear vertical subframe 56. The arched subframe 58 carries many air lines and electrical controls shown generally at 60 in FIG. 2A. In addition, control modules 62 may be mounted on the subframe 58. A high pressure air reservoir and a low pressure air manifold are carried below the platform 50.

The transplanter consists of several major subassemblies. A first major subassembly is the tray indexing mechanism which is indicated generally at 100 and which is best illustrated in FIGS. 3A to 3I. The subassembly for picking up an entire row of seedlings from a tray is indicated generally at 300, and is best illustrated in FIGS. 4A to 8. The subassembly which eliminates gaps between seedlings is indicated generally at 500 and is best illustrated in FIGS. 8 to 12B, and consists of a seedling loader group, continuously running gap-up belts, a cut-off gate and a gap-up root-ball pincher. There is a discharge mechanism which is indicated generally at 700, which mechanism includes a feeder pinch disk assembly or discharge disk assembly for dropping individual seedlings to one or more drop tubes for receipt by a planter assembly. The planter assembly, which plants individual seedlings in the ground, includes a planter frame subassembly indicated generally at 800, which frame subassembly supports furrow opening and closing mechanisms. The planter assembly further includes a plant feeder subassembly indicated generally at 1300.

Figure 2A:
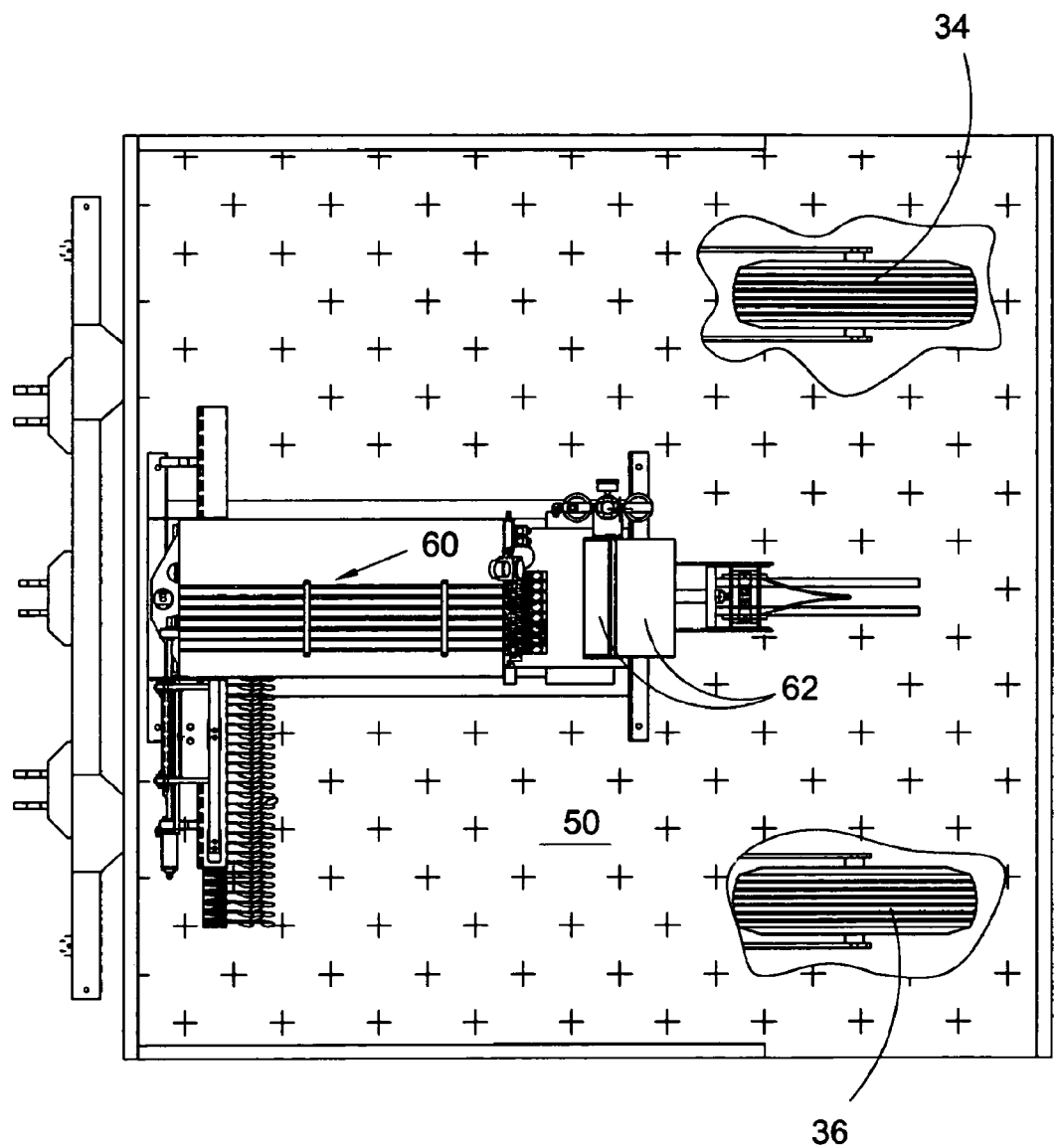
FIG. 2A is a top view of the transplanter shown in FIG. 1A, parts being broken away to show the ground wheels.
Figure 2B:
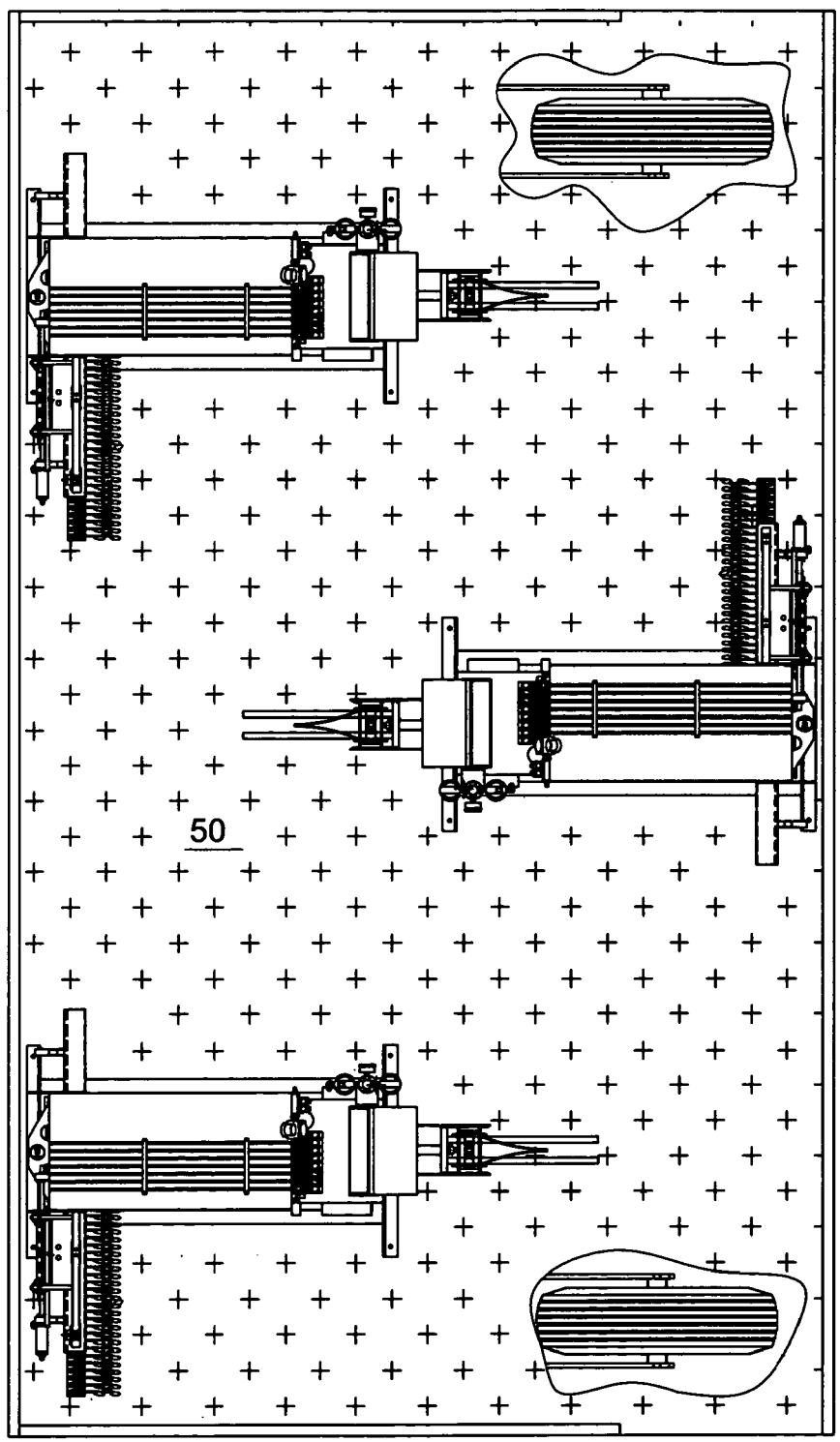
FIG. 2B is a top view of a three row transplanter of this invention.

FIG. 2B illustrates a three row version, whereas FIG. 2A illustrates a single row version. The three row version does not differ significantly from the two row version, except that the operators support platform is larger. In addition, the tray indexing mechanism, the subassembly for picking up an entire row of seedlings from a tray, and the subassembly which eliminates gaps between seedlings, and for sending the seedlings into a drop tube are reversed in the center row unit. However the planter subassembly in the center row unit, not shown, is not reversed.

Tray Indexing Mechanism

The tray indexing mechanism is best shown in FIGS. 3A-3H. Initially, it should be noted that in the transplanting industry, various nurseries use various trays, the trays having differing depths, widths, lengths, and different spacings between adjacent rows of cells. Accordingly, the tray indexing mechanism, which is indicated generally at 100, should be adjustable to accommodate trays of differing widths, etc. The indexing mechanism is carried by the vertical subframe 54 which includes a pair of vertically extending spaced apart angle iron frame members 106, 108. The indexing mechanism is provided with horizontal tray holding rails 102, 104. The top tray holding rail 102 is secured to the top of the frame members 106 and 108 by suitable fasteners 110. The bottom rail 104 is adjustably secured to one of a plurality of apertures 112 in each of the frame members 106, 108 by suitable fasteners 114, the bottom rail being shown in its lowermost position in FIG. 3A.

Figure 3A:
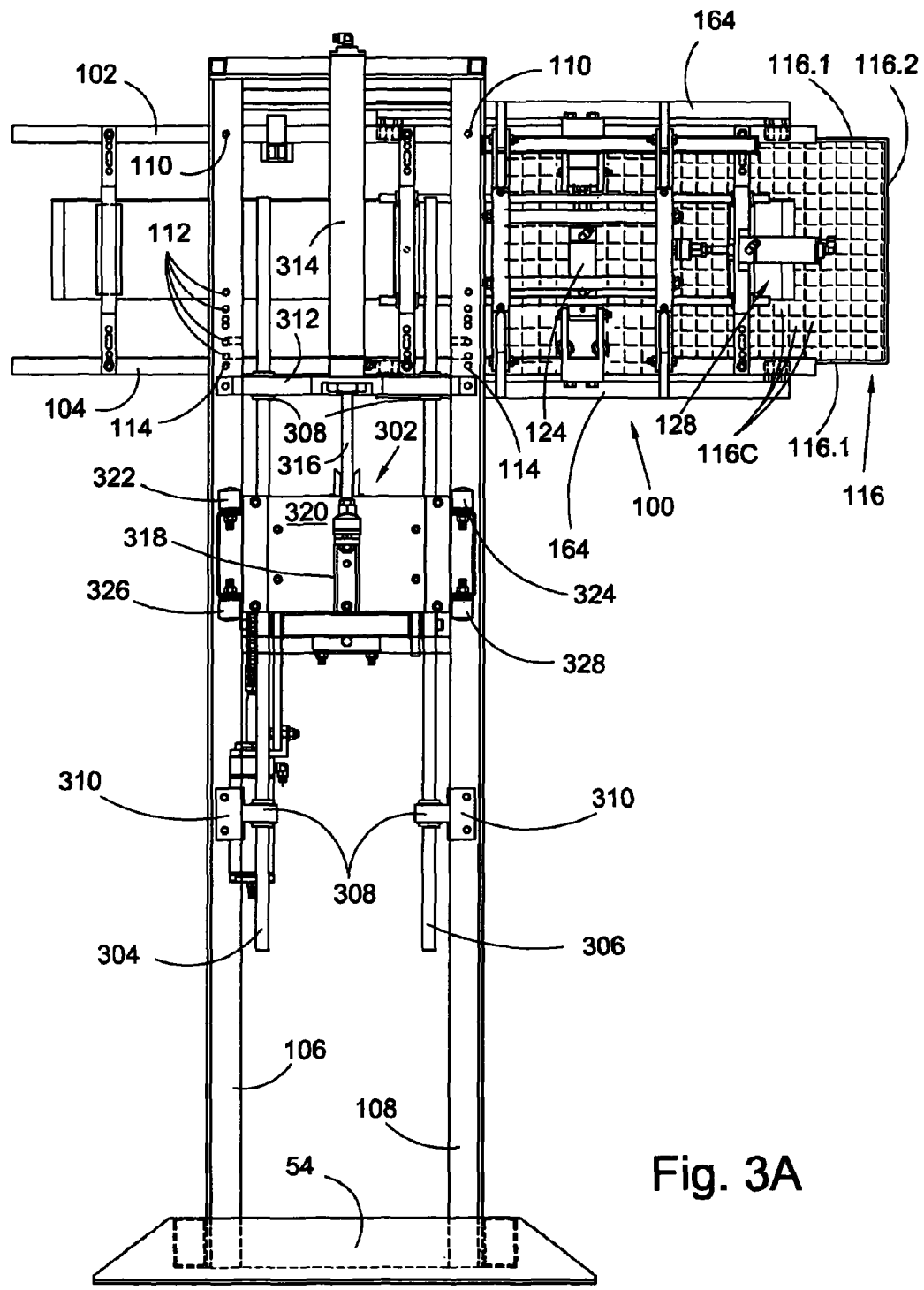
FIG. 3A is a view from the front of the transplanter shown in FIG. 1A, this view showing the mechanism for reciprocating the spears up and down, and also showing a portion of the tray indexing mechanism with a portion of a tray, portions not being shown for purposes of clarity.
Figure 3B:
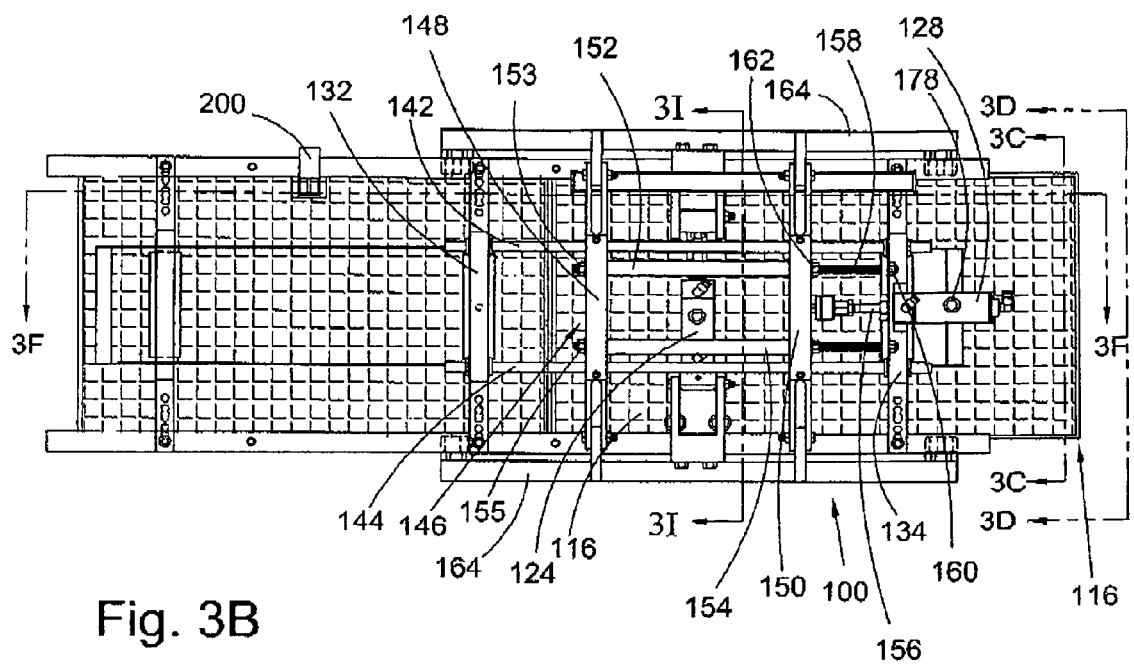
FIG. 3B is a detail of FIG. 3A further illustrating a portion of the tray indexing mechanism, two complete trays being illustrated.

In FIG. 3A a large tray is indicated generally at 116. In FIG. 3B two large trays are shown. Each of the trays is rectangular and has spaced apart long sides 116.1 and spaced apart shorter sides 116.2. Spaced between the sides are seedling receiving cells 116C which are square in cross section, open at the top, and partially closed at the bottom. This tray design is conventional and well known to those skilled in the art.

Figure 3C:
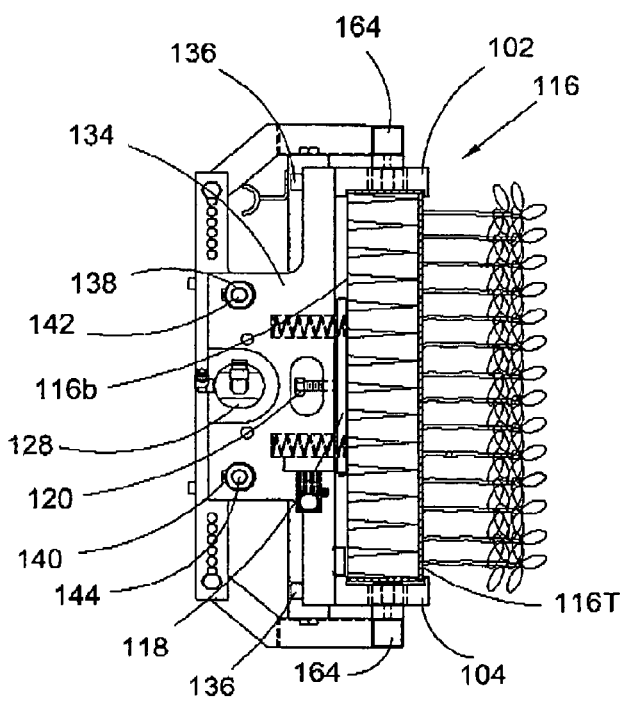
FIG. 3C is a left side view along the line 3C-3C in FIG. 3B.
Figure 3D:
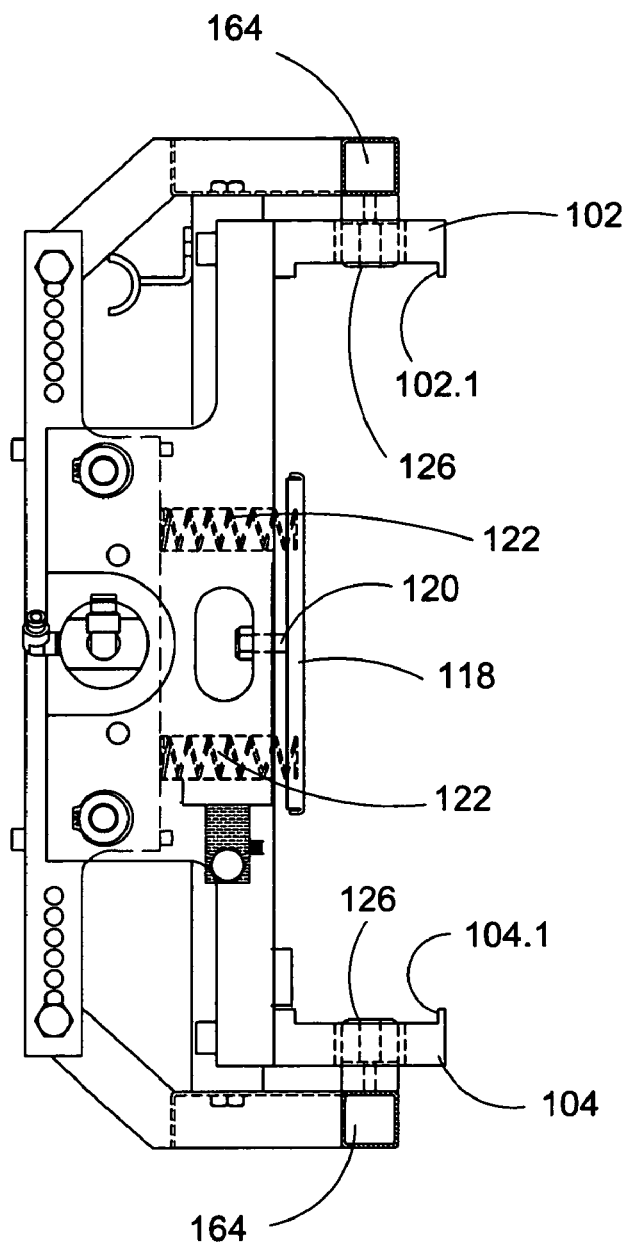
FIG. 3D is an enlarged side view taken generally along the line 3D-3D in FIG. 3B, the tray not being shown, the tray pressure plate being shown in its fully extended position.

When the trays are positioned in the tray indexing mechanism, the sides 116.1 of each tray will be slidably positioned between rails 102 and 104 and may be held by their sides 116.1. As can best be seen from FIG. 3D, each of the tray holding rails 102, 104 is provided with a rear lip 102.1 or 104.1, respectively, which rear lip engages the top side 116T of the tray 116 when it is mounted between the rails as can be seen in FIG. 3C. A pressure plate 118 will bear against the bottom 116B of the tray 116. If the tray is of a depth less than that shown in FIG. 3C, the pressure plate 118 will bear against the bottom of the tray and force it into engagement with the lips 102.1 and 104.1. The pressure plate is carried by a pair of bolts 120 (only one of which is shown) and the pressure plate is biased towards the lips 102.1, 104.1 by a pair of compression springs 122. While only a single pressure plate is shown, a pair of upper and lower pressure plates may be employed.

Figure 3E:
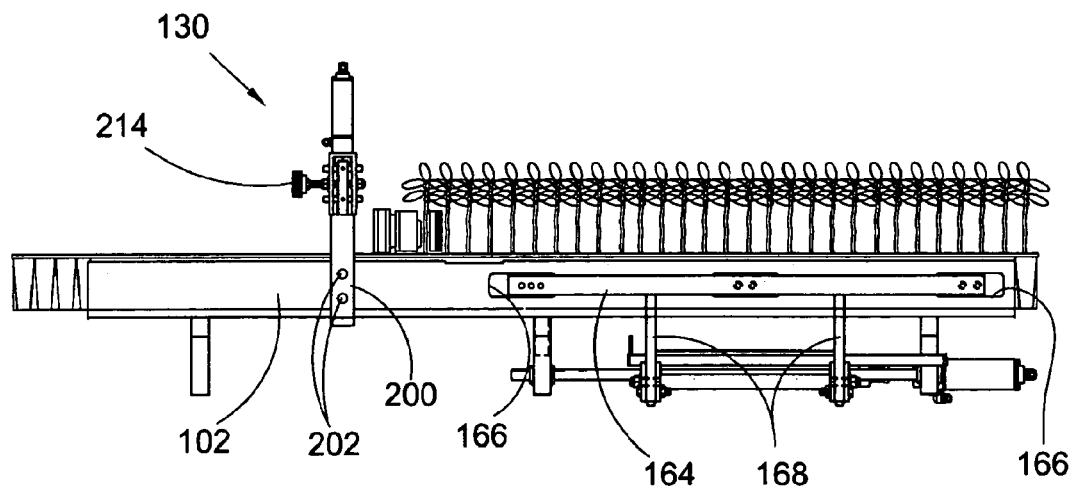
FIG. 3E is a top view of the tray indexing mechanism shown in FIG. 3B.
Figure 3F:
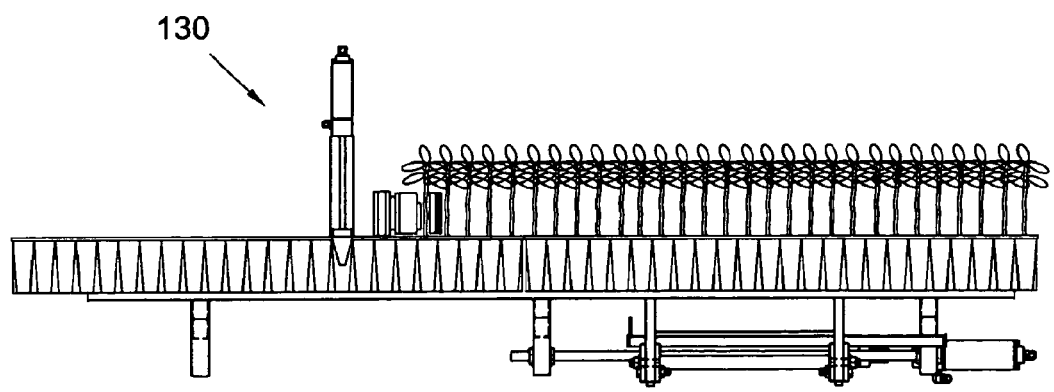
FIG. 3F is a sectional view taken generally along the line 3F-3F in FIG. 3B, showing a tray positioning lock engaging a tray to align the cells for proper spear alignment.

In summary, to index the tray when mounted between the rails, a clamping mechanism will engage the sides of a tray, the mechanism including a vertical cylinder assembly 124 (FIG. 3I) operated to cause the sides 116.1 of the tray to be clamped by spaced apart upper and lower rubber clamps 126. A horizontal cylinder assembly 128 will be operated to move the clamping mechanism to the left as seen in FIG. 3E a distance about the size of one cell. After the tray has been indexed, the clamping mechanism will release the tray by operating the vertical cylinder assembly 128 which will be extended to release the clamps. At this time a tray positioning lock mechanism indicated generally at 130 will be operated to engage a cell to finally position the tray.

The indexing mechanism further includes a pair of mounting structures 132, 134 (FIG. 3B) which are secured via fasteners 136 (FIG. 3C) at their upper and lower ends to the fixed rails 102, 104. As best shown in FIGS. 3B and 3C, each of the mounting structures 132, 134 is provided with a pair of upper and lower bushings 138, 140 which receive slide rods 142, 144, respectively. A slidable subframe assembly indicated generally at 146 is mounted on the slide rods for sliding movement with the rods. The slidable subframe includes right and left mounting plates 148, 150, respectively. The plates are suitably secured to the slide rods so that they will move with the slide rods. In addition, a pair of upper and lower spacers 152, 154 are placed about bolts 153, 155. Each bolt is screwed into the left mounting plate 150, the bolts being turned until the spacers 152, 154 are trapped between the mounting plates 148, 150. This will insure that the plates 148, 150 will move together. The slidable subframe 146 is caused to move by the horizontal cylinder assembly 128. To this end, the cylinder of the assembly is rigidly secured to the mounting structure 134 with the rod 156 extending thorough a suitable aperture in the structure 134. The end of rod 156 is secured to the left mounting plate 150 in any suitable manner. When the cylinder assembly 128 is extended, the subframe assembly will be moved away from the mounting structure 134, and when the cylinder assembly 128 is retracted, it will be moved towards the structure 134. A pair of adjustable stops limit the movement of the rod towards the structure 134, the stops being adjusted so that the movement of the rod from its fully extended position to its stopped position approximates the width of a cell on the tray. Each of the stops may include a threaded rod 158 which passes though a suitable threaded aperture in structure 134, a nut 160 to hold the rod in its position of adjustment, a bumper 162 at the end of the rod, which bumper is contacted by the left mounting plate 150 when the slidable subframe assembly is moved towards the mounting structure 134.

The rubber clamps 126 are caused to clamp the tray 116 by operation of the vertical cylinder assembly 124. To this end, each of the upper and lower rubber clamps is carried by a horizontal bar 164, there being three spaced apart rubber bumpers on each bar, the rubber bumpers being adapted to pass through suitable elongated apertures 166 in the upper and lower fixed rails 102, 104. Each of the horizontal bars 164 is carried by a pair of spaced apart arms 168 which are secured for pivotal movement to a mounting plate via pivot pins 170, plate 148 being shown in FIG. 3I. Each arm is provided with an inwardly extending cylinder mount 172. The cylinder assembly includes a cylinder 174, the anchor end 175 being secured to one of the cylinder mounts 172, and the rod 176 being secured to the other cylinder mount. The cylinder assembly 124 is a double acting cylinder, and when retracted it will cause the rubber clamps to bear against the sides of the tray 116, and when the cylinder is retracted, it will cause the rubber clamps 126 to move away from the sides of the tray 116.

In operation, after suitable trays have been slid between the top and bottom tray holding rails 102, 104, it will be necessary to initially engage the right hand tray (as viewed in FIG. 3B) with the rubber clamps. As the clamps will move with the slidable subframe assembly, to move trays to the left as viewed in FIG. 3B, it is only necessary to extend the horizontal cylinder assembly 128, which will cause the associated trays to move to the left approximately one cell width, movement of the right hand tray to the left causing the left hand tray to move an equal distance as the trays abut one another. Once this movement has been completed, as can be sensed by sensor 178 on cylinder 128, the cylinder will be retracted a distance about equal to one cell width. However, before retraction can take place, it is necessary to extend the vertical cylinder assembly 124 to cause the rubber clamps to move away from the sides of the associated tray(s), so that the trays will not move during retraction of the horizontal cylinder. For control purposes, the vertical cylinder is also provided with a sensor 180.

As previously noted a tray positioning lock assembly 130 is provided to engage a tray to align the cells for final positioning and for proper spear alignment, which tray positioning lock mechanism can be considered as a portion of the tray indexing mechanism. In this regard, it should be observed that the tray indexing mechanism described above may work well with a single tray, but after one tray has been fully discharged, and before the next tray starts, there is a double wall thickness which is not adjusted for in the stop assembly 158-162. In addition, it is possible that cumulative indexing errors may occur. Therefore, it is essential that a final positioning apparatus be provided to insure that after every indexing movement a final and correct position is attained.

The tray positioning lock assembly 130, which is the final positioning apparatus, is supported on the top tray holding rails 102. To this end an L-shaped mounting bracket 200 is provided, the part having a wide rectangular portion 200.1 (FIG. 3G) provided with suitable apertures for the reception of fasteners 202 (FIG. 3E) so that it may be secured to top rail 102. The L-shaped bracket further includes a relatively narrow rectangular extension 200.2 which carries round bars 204 secured in place by set screws 206. A C-shaped member 208 is slidably carried by the bars 204 and may be moved to various positions of adjustment. To this end, a threaded rod 210 passes through a threaded aperture in portion 200.2, the threaded rod carrying spaced apart nyloc nuts 212 which bear against opposite sides of the C-shaped member. A hand knob 214 is carried by one end of the threaded rod. It should be apparent that if the threaded rod is rotated by the knob 214, the C-shaped member will be caused to be moved from side to side. The C-shaped member carries a cylinder assembly indicated generally at 216, which is secured to the bight portion 208.1 of the C-shaped member. The rod 218 of the cylinder assembly 216 carries a V-shaped tray centering plunger 220. It should be apparent that when the rod 218 and centering plunger are extended, the V-shaped plunger will enter a cell and cause the associated tray, which has been released for sliding movement, to move laterally, if necessary, to center the tray. In order to prevent bending of the tray when this occurs, the L-shaped member carries a skid-shoe 222 which may be adjustably positioned to conform to the thickness of the tray.

Subassembly for Picking Up a Row of Seedlings

The subassembly for picking up an entire row of seedlings consists of two pairs of spears, which spears are mounted on a vertically reciprocal carriage assembly indicated generally at 302. As can best be seen from FIG. 3A, the carriage assembly includes vertical right and left slide rods 304 and 306, which are secured thereto. The rods are received in upper and lower bushings 308. The lower bushings are carried by lower bushing mounting brackets 310 which are in turn secured to the right and left frame members 106, 108. The upper bushings 308 are carried by an upper cross member 312 also secured to the right and left frame members 106, 108. A carriage reciprocating double acting air cylinder assembly is carried by the cross member 312, the assembly including a cylinder 314 secured to the cross member 312, and a downwardly extending rod 316 which passes through a suitable aperture in cross member 312. The lower end of rod 316 is secured to a suitable bracket 318, which is in turn carried by the principal cross plate 320 of the carriage assembly. Upper right and left bumpers 322, 324, as well as lower right and left bumpers 326, 328 are carried by the cross plate 320 and limit the movement of the carriage. When the double acting cylinder assembly 314, 316 is retracted, the upper bumpers 322, 324 will contact the cross member 312. Similarly, when the cylinder assembly is extended the bumpers 326, 328 will contact the right and left brackets 310.

Mounted on the cross plate 320 are right and left rearwardly extending plates 330 and 332, respectively. A pivot shaft 334 is rotatably supported by the plates. An L-shaped bracket 336 is carried at the lower end of the right hand plate 330. Fore and aft double acting air cylinders 338, 340, respectively, are secured to the underside of the L-shaped bracket, and the rods 342, 344 of the respective cylinders extend above the bracket, each rod terminated in a clevis, 346, 348, respectively. A chain 350 is secured to the two devises and passes over a sprocket 352 secured to an end of shaft 334. It should be apparent that as the cylinders are extended and retracted they will cause the shaft to rotate. Extension and retraction of the cylinder are monitored by a sensor 354 mounted on one of the cylinders.

Figure 4A:
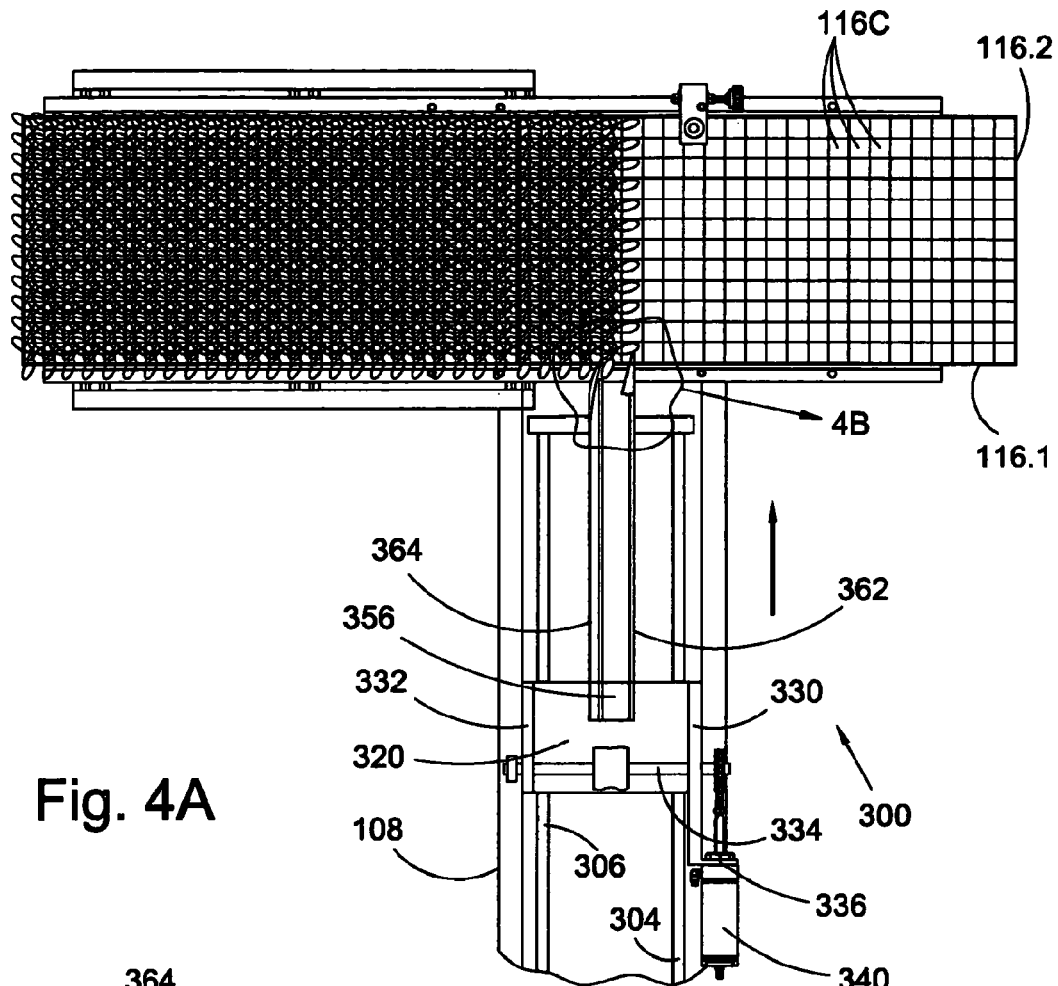
FIG. 4A is a rear elevational view of the tray indexing mechanism and further showing the foliage separation spear and the foliage deflector spear in their lower positions where the tip of the foliage separation spear is positioned where it can be extended to cause separation of seedlings in adjacent trays, the spear point of the foliage deflector spear lifting seedlings that may be laying over, the tray having been engaged by the tray positioning lock shown in FIG. 3H.

Fixed to the cross plate 320 is a first mounting block 356, and secured to the pivot shaft 334 is a second mounting block 358. A first pair of spears are carried by the first mounting block for reciprocal vertical movement only, the first pair including a foliage separation spear 360 and a foliage deflector spear formed of a long bar 362 and a spear point 363. As can best be seen from FIGS. 5B and 5C, the foliage separation spear is generally L-shaped in cross section, except that its top point is curved towards the spear point as can be seen from FIG. 4B, and it additionally has a tapered leading edge 360.1 as can best be seen from FIGS. 7 and 8. A pair of right and left seedling pivotal extraction spears are indicated generally at 364 and 366, respectively. They are carried by the second mounting block 358 for reciprocal and pivotal movement as can best be seen from an inspection of FIGS. 4A, 4C, and 5A which show the spears moving up through the seedlings carried by a tray. FIGS. 6A and 7, FIG. 6A show the initial pivotal movement of the extraction spears away from the tray of seedlings, the separation and deflector spears still being in their fully raised position. FIG. 7 shows the extractions spears and the separation and deflector spears in their lowered position. A stop arm 367 is secured to the pivot shaft 334 and carries adjustable stops 367A and 367B which limit the rotational movement of the extraction spears, the stops contacting an abutment block 333 mounted on left plate 332.

Figure 4B:
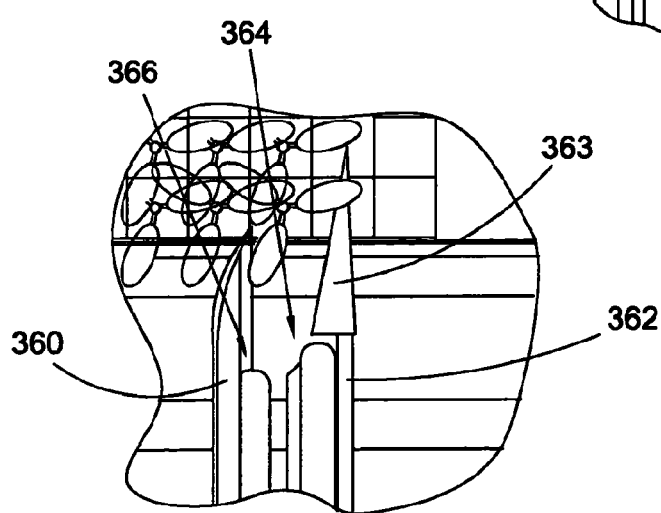
FIG. 4B is an enlarged view of a portion of FIG. 4A.
Figure 4C:
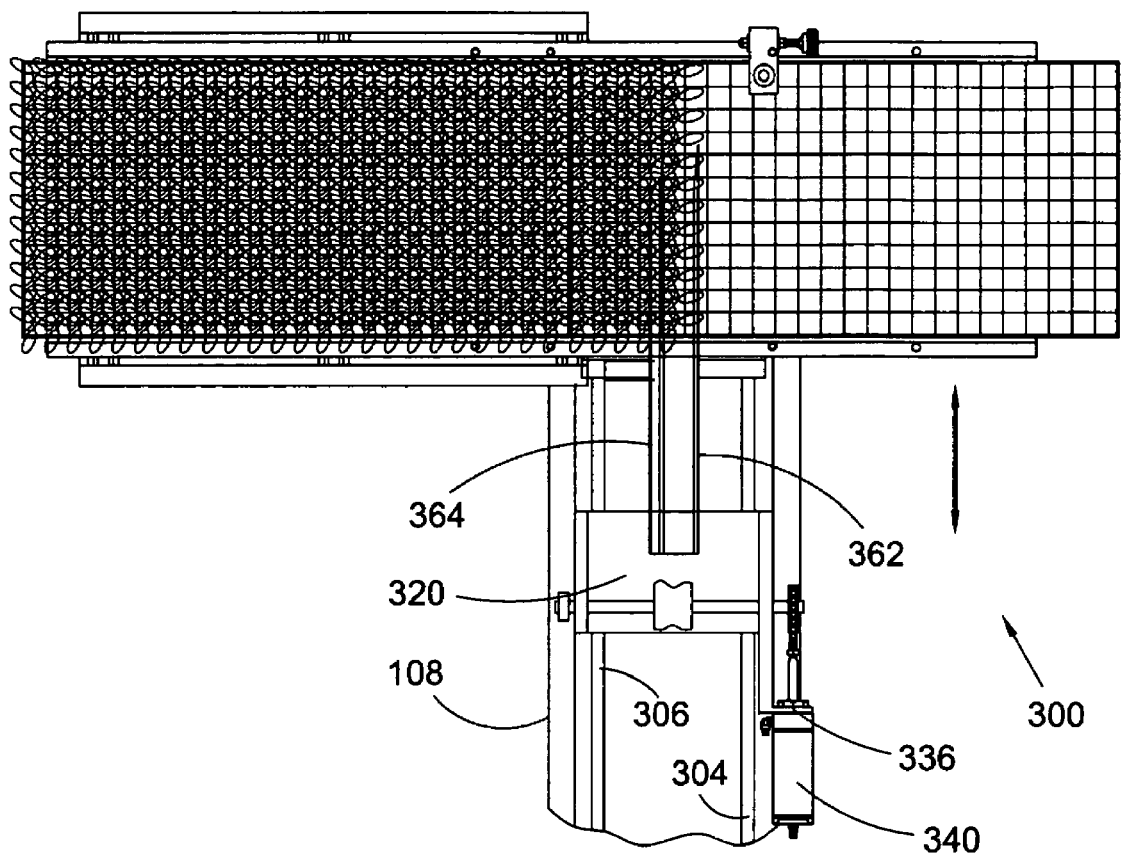
FIG. 4C is a rear view showing the foliage spears and the pivotal seedling extraction spears partially raised.
Figure 5A:
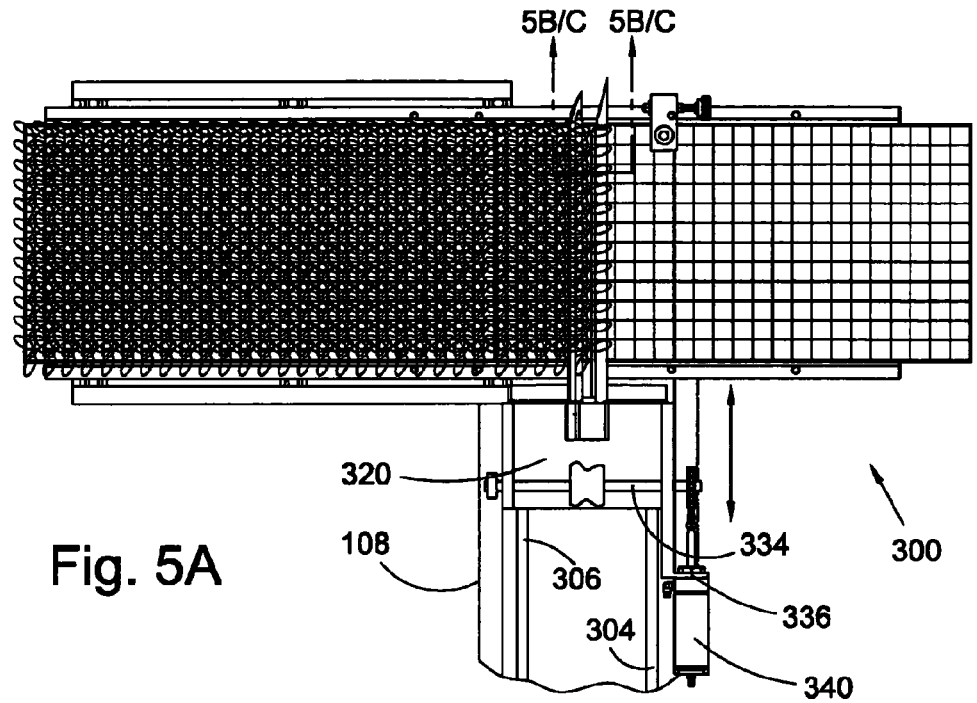
FIG. 5A is a view similar to FIG. 4C, but showing the foliage spears and the pivotal seedling extraction spears in a raised position, where they may be "bumped" or "jittered" to ensure all of the seedlings are in the pivotal seedling extraction spears.
Figure 5B:
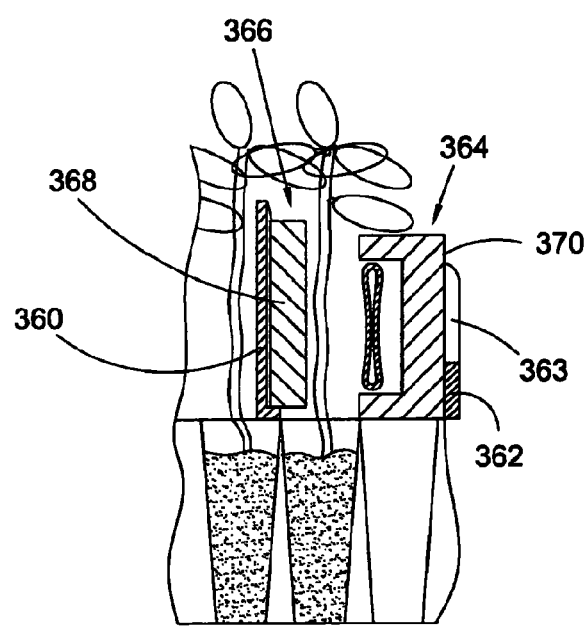
FIGS. 5B and 5C are views taken generally along the line 5B/C-5B/C in FIG. 5A showing in FIG. 5B the extraction bladder of the pivotal seedling extraction spears collapsed after a vacuum has been drawn on the bladder and showing in FIG. 5C the bladder inflated and expanded against the seedling stems.
Figure 5C:
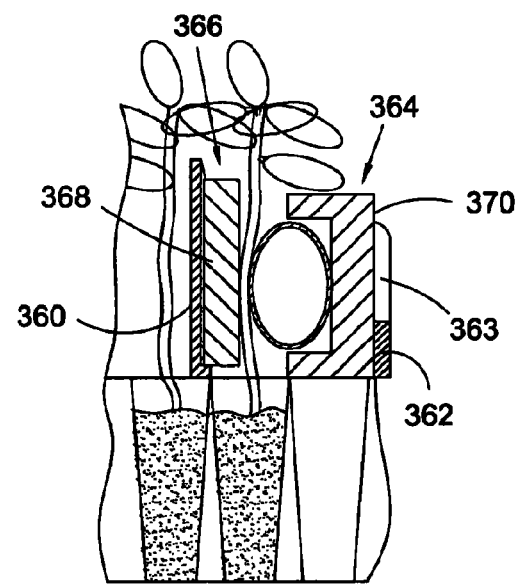
Figure 6A:
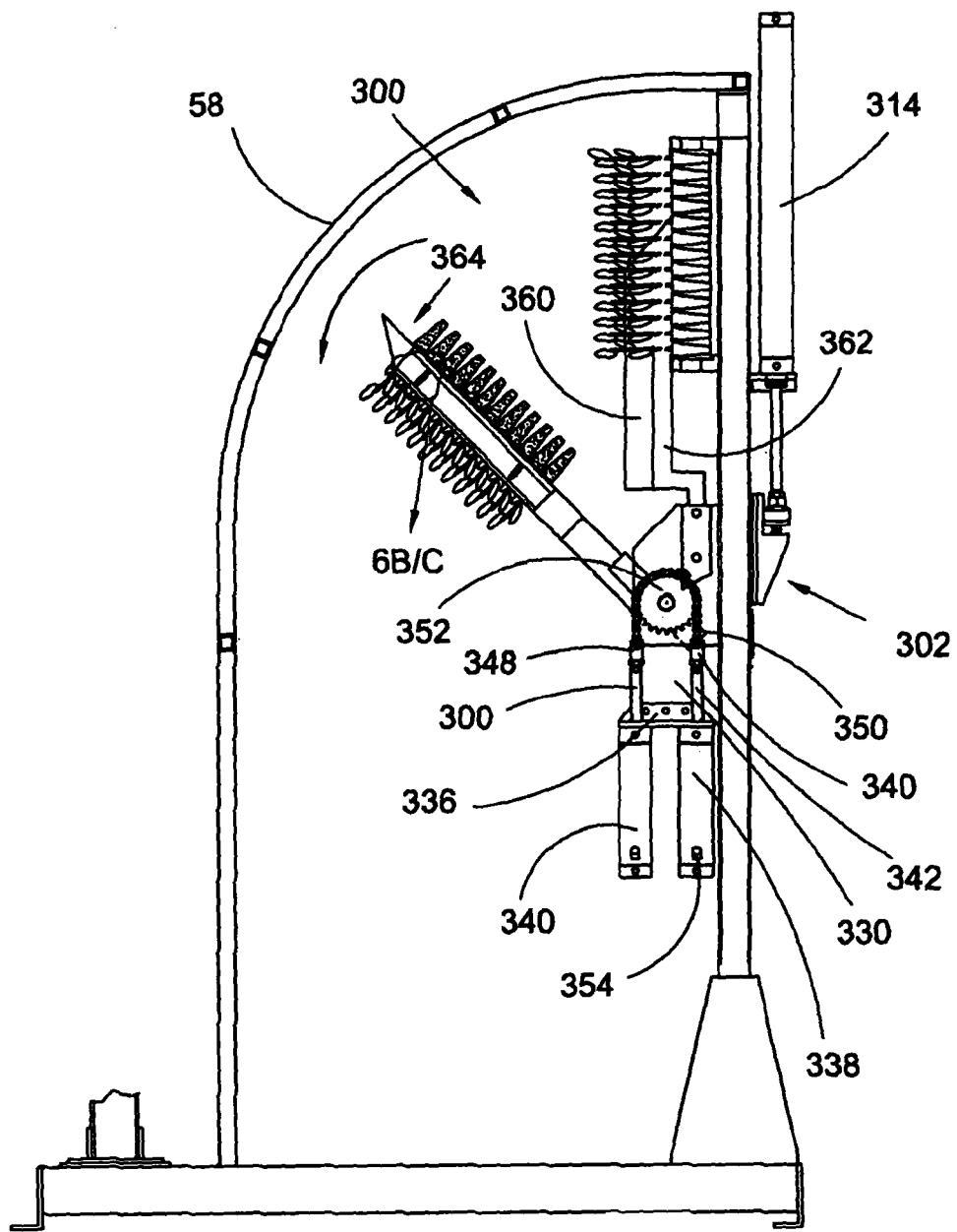
FIG. 6A is a right side elevational view showing the pivotal seedling extraction spears in an intermediate position as they move from a raised position to a delivery position, the spear support carriage being still in the fully raised position.
Figure 6B:
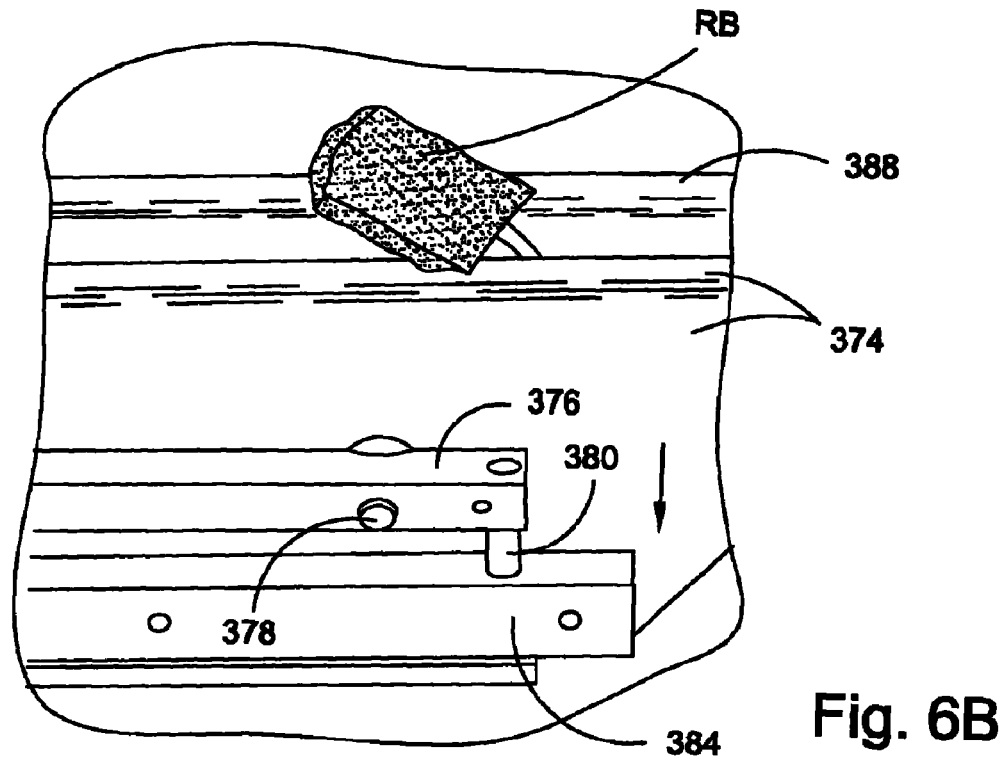
FIGS. 6B and 6C are perspective views illustrating how the spring loaded side plates on the seedling extraction spears raise to cause the root-ball to assume an erect position.
Figure 6C:
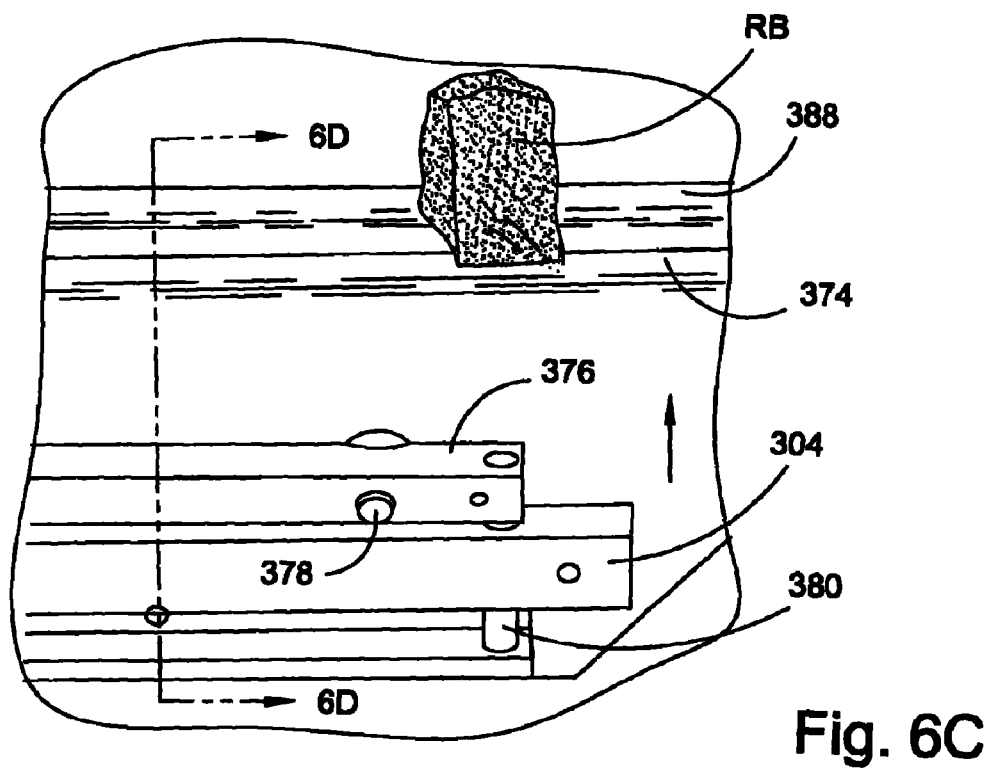
Figure 6D:
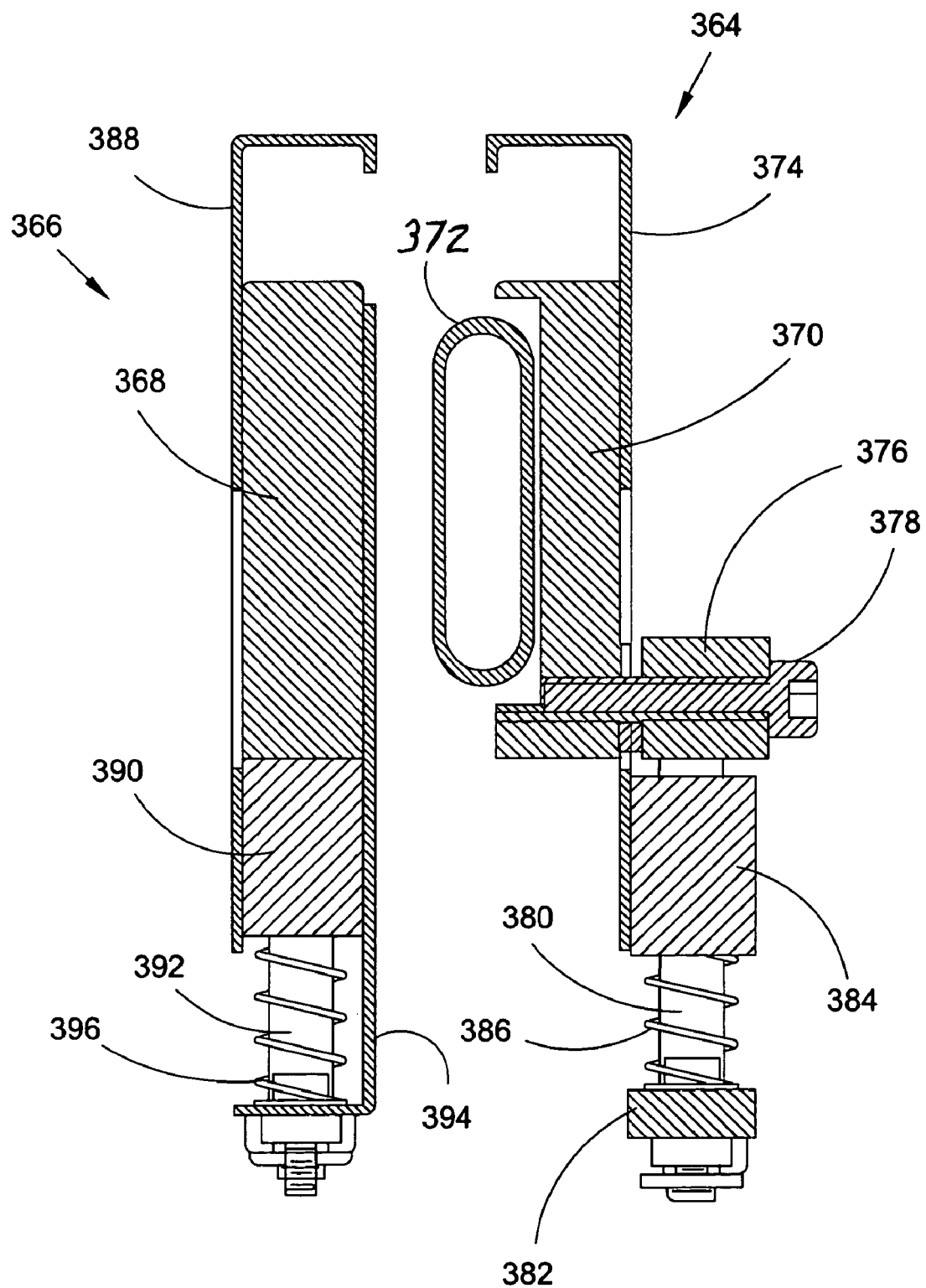
FIG. 6D is a cross section through the seedling extraction spears when in their lowered position, this view being taken generally along the line 6D-6D in FIG. 6C, seedlings being omitted for purposes of clarity.
Figure 8:
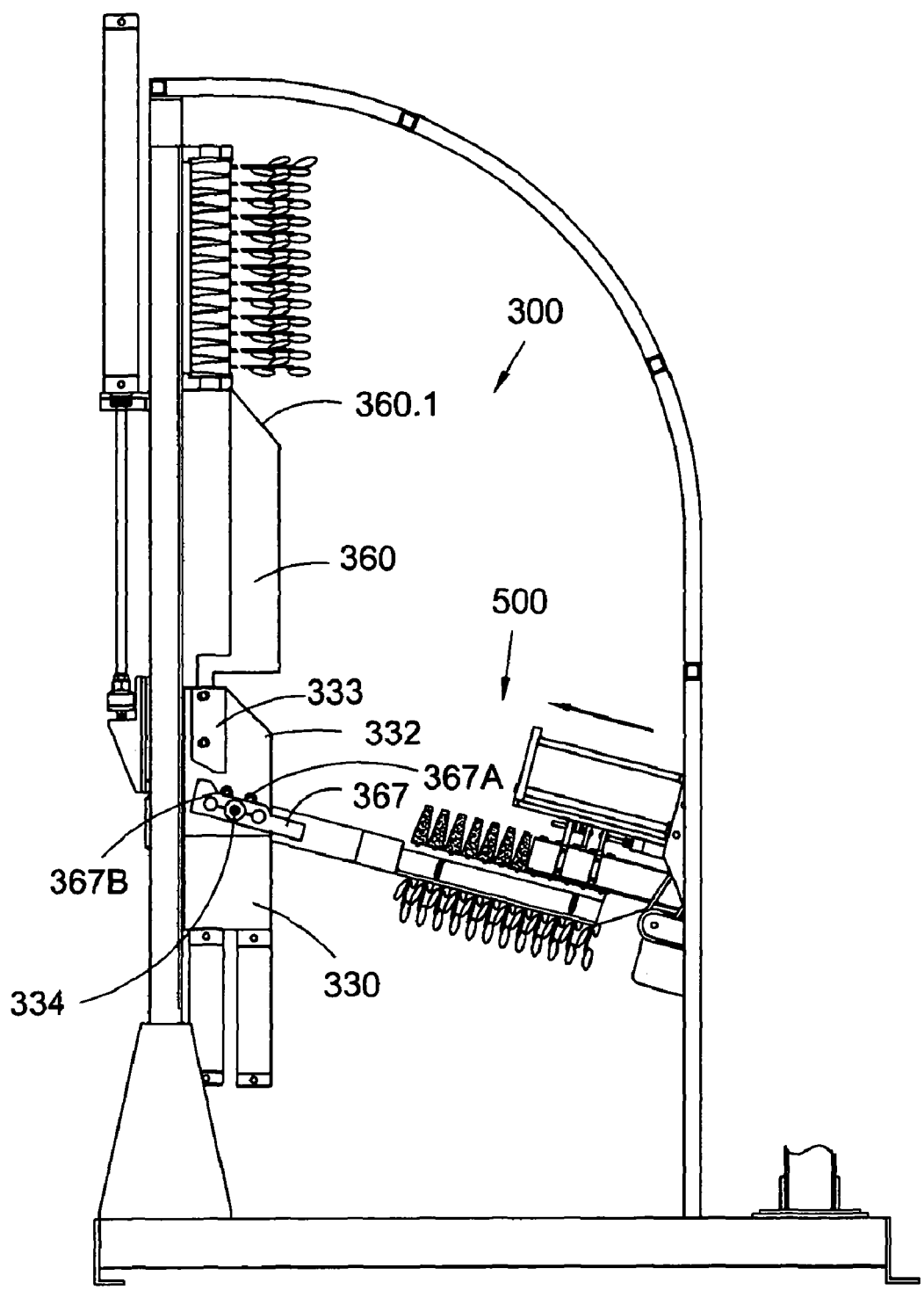
FIG. 8 shows the seedling loader group moving to the seedlings carried by the seedling extraction spears, parts being omitted.

In certain positions of operation the seedling extraction spears are designed to fit between the foliage engaging spears as can best be seen from FIGS. 4B, 5B and 5C. Thus, the left foliage extraction spear 366 includes a generally rectangular member 368 as shown in FIG. 6D. The lower end is secured to the mounting block 358 carried by the pivot shaft 360. The right hand foliage extraction spear has a C-shaped elongated member 370 which carries a bladder 372 shown in its normal position in FIG. 6D.

At the commencement of operation of the spears, they will be in the positions shown in FIGS. 4A and 4B as well as in the position shown in FIG. 7, except that the seedling extraction spears will be free of seedlings. Operation of the cylinder 338, 340 will cause the seedling extraction spears to pivot about the shaft 334 from the retracted position shown in FIG. 7 until they reach the extended position where they lie between the foliage spears 360, 362. After the rotational movement has been completed, they will still be in a carriage lower position shown in FIG. 4A. At this point a vacuum will be drawn on the bladder 372 via a venture vacuum pump (not illustrated) to collapse it to the position shown in FIG. 5B, the pump being connected to the high pressure air compressor via suitable lines and valves. The cylinder 314 will now be operated to move the carriage 302 upwardly which will cause corresponding movement of the two pairs of spears. The leading spear point 363 of foliage deflector spear will slide up along the right hand edge of the row of seedlings which are to be engaged, and force up the stems and foliage which may be leaning to the right so they may be engaged by the seedling extracting spears. At the same time the left foliage separation spear, which extends further away to the tray which carries the seedlings, will act to untangle the foliage of adjacent rows of seedlings to facilitate engagement. When both pairs of spears have initially attained their raised position shown in FIG. 5A, they may be "bumped" or "jittered" to ensure all of the seedlings are in the pivotal seedling extraction spears. The bladder will be inflated to firmly engage the stems of the seedlings as shown in FIG. 5C, inflation being controlled via a suitable valve interconnected with the high pressure air compressor. The seedling extraction spears will now be rotated away from the seedling trays to the position shown generally in FIG. 6A, where the cylinder 314 will now be operated to lower the carriage and both pairs of spears, the pivot shaft rotating cylinders continuing to operate to move the seedling engaging spears to their fully lowered position shown in FIG. 7. In this respect, the carriage 302, cylinder 314, shaft 334, and cylinders 338, 340 can be considered means for moving the foliage extraction spears 364, 366 between extended and retracted positions. Thus, the spears 364, 366 are moved from a position below the seedlings as shown in FIG. 4A to a position where the seedlings are between as shown in FIG. 5A, the spears 364, 366 then being moved away from the tray as shown in FIGS. 6A and then FIG. 7.

Typically the root ball of the seedling will not extend to the top of the cells in the tray. Thus, when they are extracted, as the extraction spears do not extend into the cells of the tray, there would be a tenancy for the root balls to tip over, this being illustrated in FIG. 6B. In order for the seedling loader group to properly engage the root balls, it is necessary to bring them into an erect position. This is accomplished by spring loaded side plates on the seedling extraction spears, which will move from a compressed position when in the FIG. 5A position where the extraction spears initially engage the stems of the seedlings, to a raised position as illustrated in FIG. 6C to cause the root-ball to assume an erect position.

The spring loaded side plate for the right hand extraction spear 364 is indicated at 374. The member 370 has an elongated support 376 which is suitably secured thereto by fasteners 378. Downwardly extending dowels or rods 380 are carried by the support 376, and a bar 382 is carried at the lower ends of the dowels. Mounted for sliding movement is an apertured side plate support 384 to which the right side plate 374 is secured. Springs 386 normally bias the support 384 and plate in an upwardly direction to raise the root balls RB to the position shown in FIG. 6C. The left-hand seedling extraction spear 366 is also provided with a side plate 388 mounted on a side plate support 390. The support 390 is mounted on dowels 392 carried by an L-shaped mounting plate 394, and springs extend between a portion of the mounting plate and the side plate support to normally force the side plate to a raised position.

Gap Eliminating Subassembly

Figure 9:
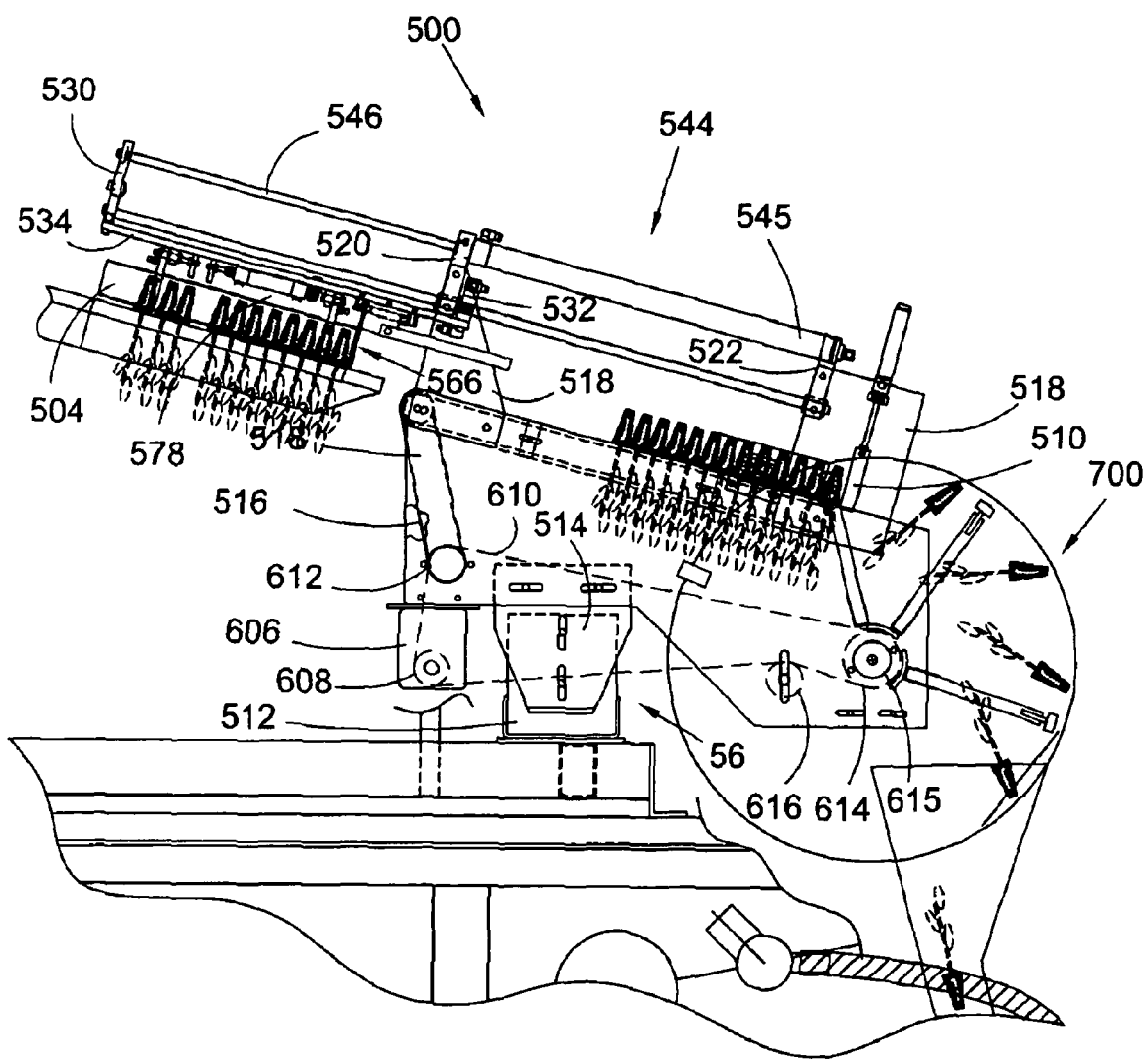
FIG. 9 shows the seedling loader group positioned over the seedlings carried by the seedling extraction spears.

The subassembly which eliminates gaps between seedlings is best illustrated in FIG. 9. The gap eliminating subassembly includes a plant transfer carriage or seedling loader group indicated generally at 500, which group carries root ball loaders in the form of right and left opposed sheet metal structures 502, 504. The seedling loader group will engage the root balls of the seedlings and move them towards and over a pair of gap-up belts 506, 508 which run continuously during the operation of the apparatus of this invention. When the root-balls of the seedlings are fully positioned over the gap-up belts, they will be released, and the tops of the root balls, which are in an upside-down position, will rest on the gap-up belts for movement towards a cut-off gate 510. The cut-off gate will be operated in a suitable manner to release one seedling at a time, which seedling will be picked up by a discharge mechanism 700, which will be described below.

The vertical subframe 56 which supports the seedling loader group and the gap-up belts includes a lower weldment having a pair of spaced apart vertically extending plates 512 and an upper weldment also having a pair of spaced apart vertically extending plates 514, which plates 512 and 514 may be adjustably secured to each other. The vertical subframe further includes upper right and left spaced apart plates 516, 518, respectively. In the illustrated embodiment, each of the plates 516 and 518 are made of three pieces, which are bolted together, however, it could be made of a single piece.

Extending between upper portions 516 and 518 are front and rear transverse plates 520, 522. Each of the plates receive right and left slidable rods 526, 528. Suitably secured to the rods are a front triangular support 530 and a rear support/manifold 532. The mounting plate 534 for the root ball loaders 502 and 504 is interconnected to the front and rear plates 530, 532 for movement therewith. Carried by the mounting plate 534 are front and rear pivot plates 536, 538, (FIG. 12), each carrying a pair of pivot arms 540, the sheet metal structures 502, 504 being secured to the arms 540. The arms are biased towards each other by front and rear springs 542.

Figure 9A:
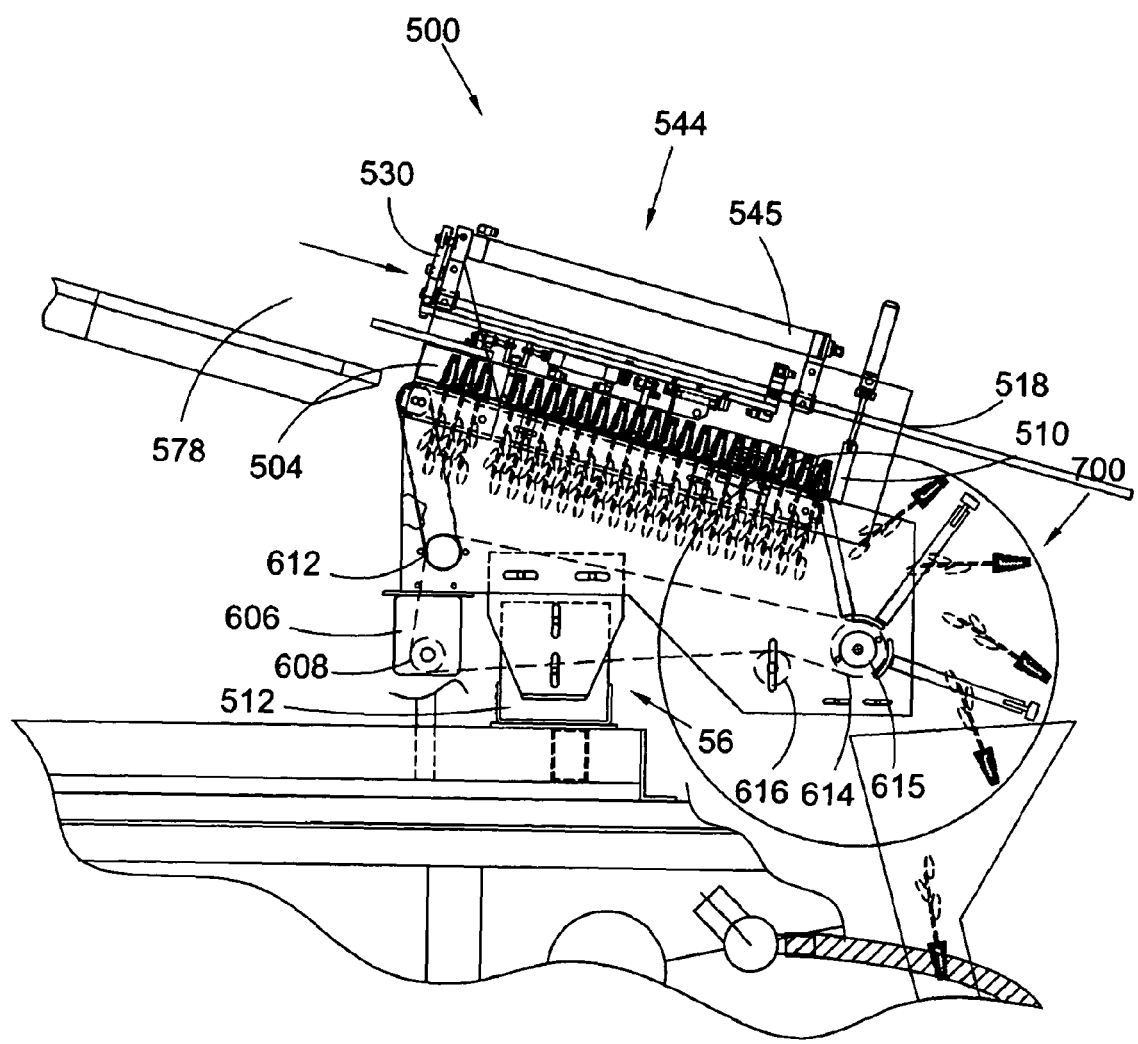
FIG. 9a is a view similar to FIG. 9, but showing seedlings delivered to the gap-up mechanism, a gap in the seedlings being shown.
Figure 10:
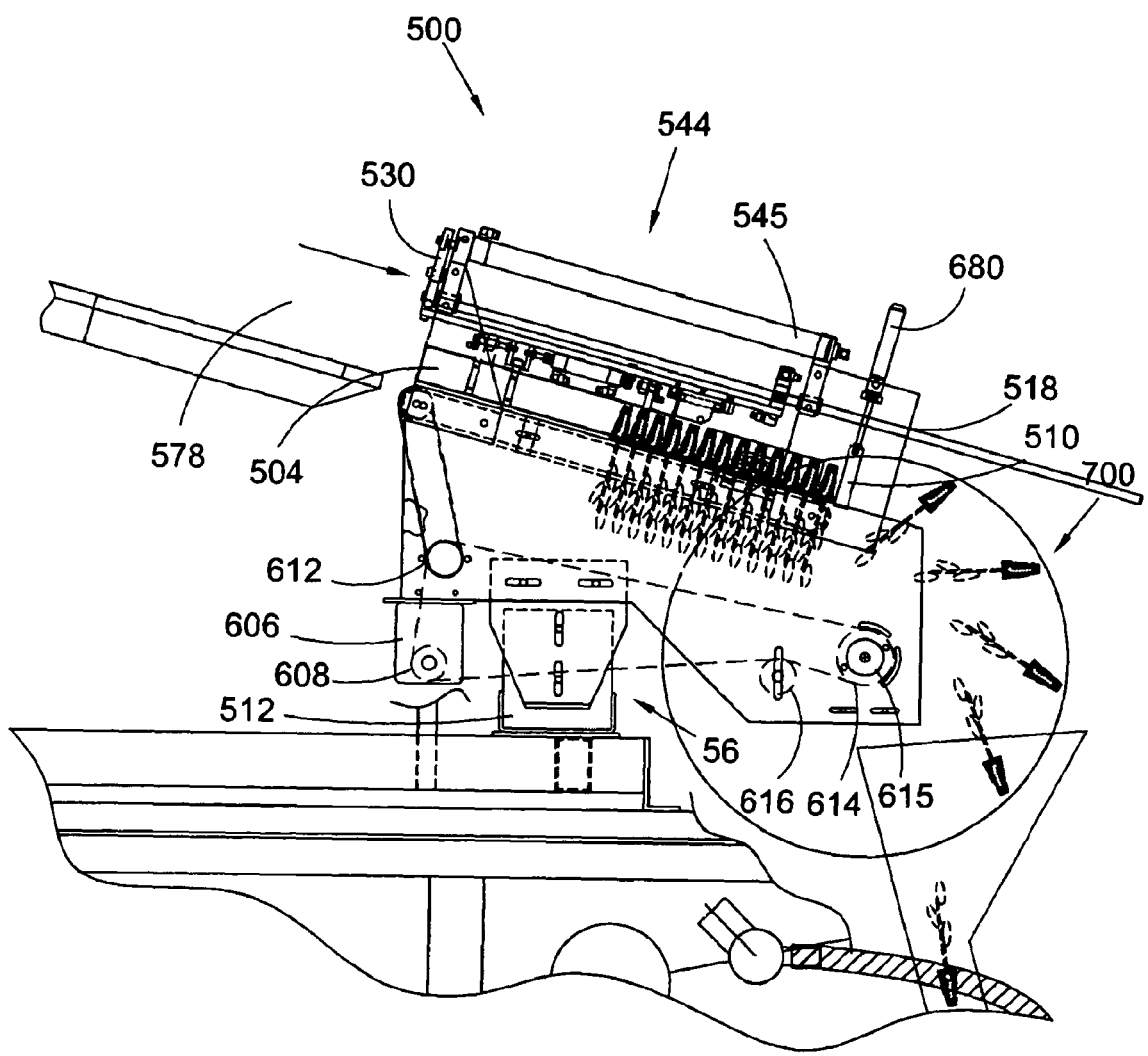
FIG. 10 is a view similar to FIG. 9a but showing no gap in the seedlings after a number of seedlings have been discharged.

The root ball loaders 502, 504 are moved between a forward position, shown in FIG. 9 and a rear position shown in FIGS. 9a and 10 by an air cylinder assembly 544 including cylinder 545 and rod 546. The anchor end of cylinder 545 is secured to the rear transverse plate 522, the front end of the cylinder 545 is supported by front transverse plate 520, the front transverse plate being apertured so that the rod 546 of the cylinder may pass through. The front end of the rod is secured to the front support 530. It should be apparent that as the cylinder assembly is extended, the root ball loaders 502, 504 will be moved in a forward direction, and as the cylinder is retracted the root ball loaders will be moved in a rearward direction towards the discharge mechanism 700.

Figure 13:
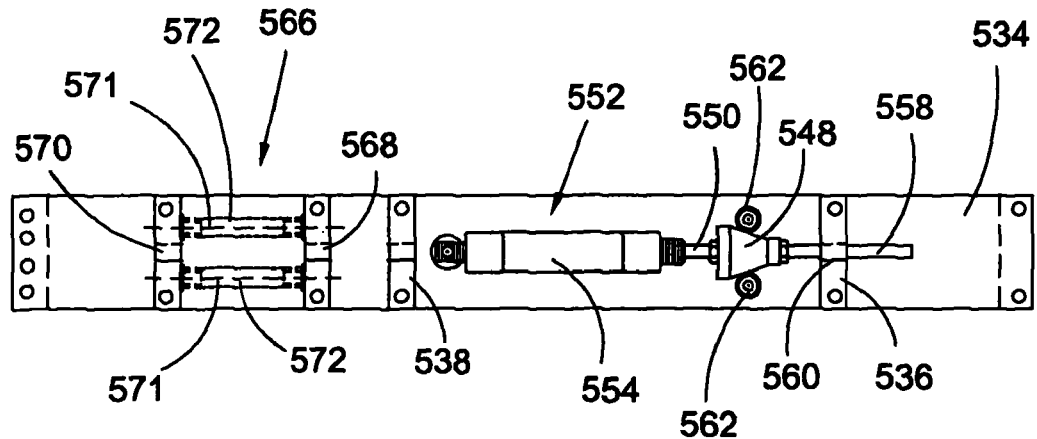
FIG. 13 is a bottom view of a portion of the structure shown in FIG. 12, parts being omitted for purposes of clarity.
Figure 13C:
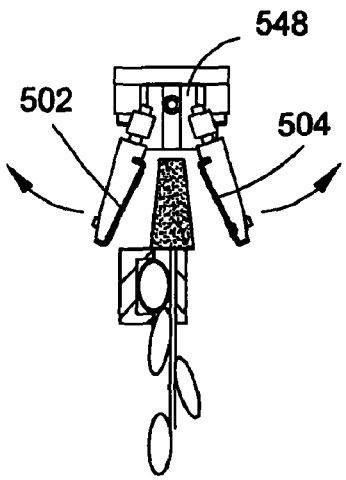
FIGS. 13C and 13D are enlarged sectional views showing how a cam is operated by a cylinder assembly to force the root ball loaders from a closed position shown in FIG. 13C to an open position shown in FIG. 13D.
Figure 13C:
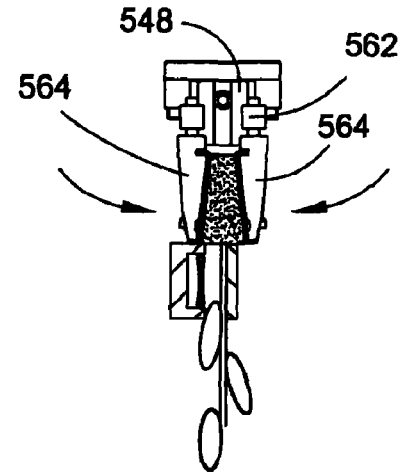
Figure 13C:
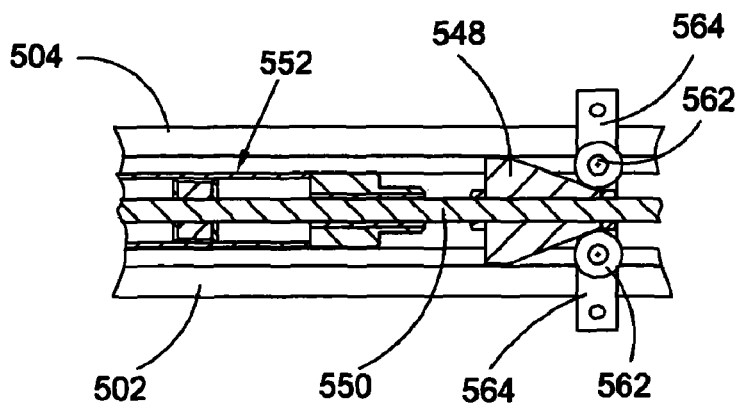
Figure 13D:
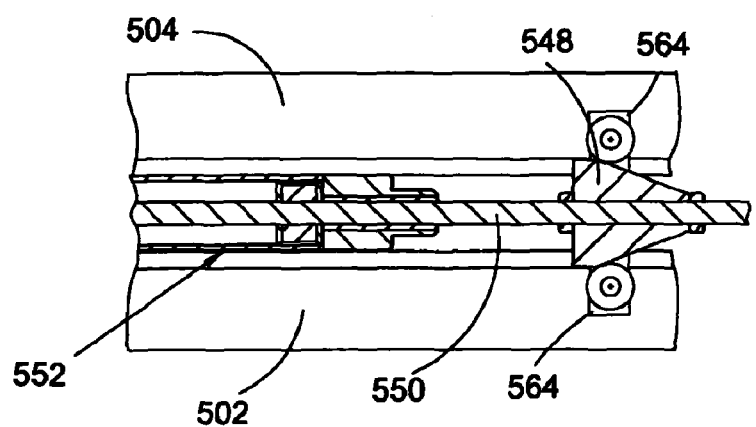

The sheet metal root ball loaders are caused to open by a cam 548 (FIG. 13). A rod 550 of cylinder assembly 552 carries the cam, the anchor end of cylinder 554 being secured in a suitable manner to the mounting plate 534 via nut and bolt assembly 556. A rod extension 558 is carried by the cam 548 and passes through a suitable bushing 560 in the front pivot plate 536. The cylinder assembly 552 is a double acting air cylinder and is suitably connected to ports in the rear support/manifold 532 by air lines, not shown. The manifold is in turn connected to separate air lines for controlling the extension and retraction of the cylinder. When the cylinder assembly 552 is extended, the cam 548 will engage cam followers 562 on cam follower arms 564 carried by the structure 502 and 504, to cause the sheet metal structures to open as shown in FIGS. 13a and 13D. When the cylinder assembly 552 is retracted, springs 542 will cause the sheet metal structures to close and grasp any root balls between them.

Figure 12:
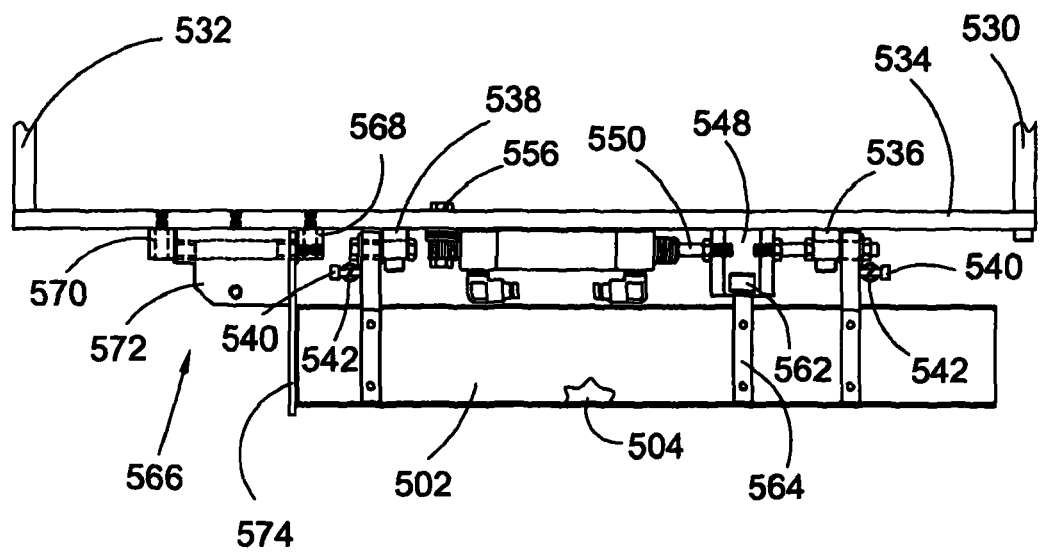
FIG. 12 is a right side view of a portion of the seedling loader group.
Figures 14, 15:
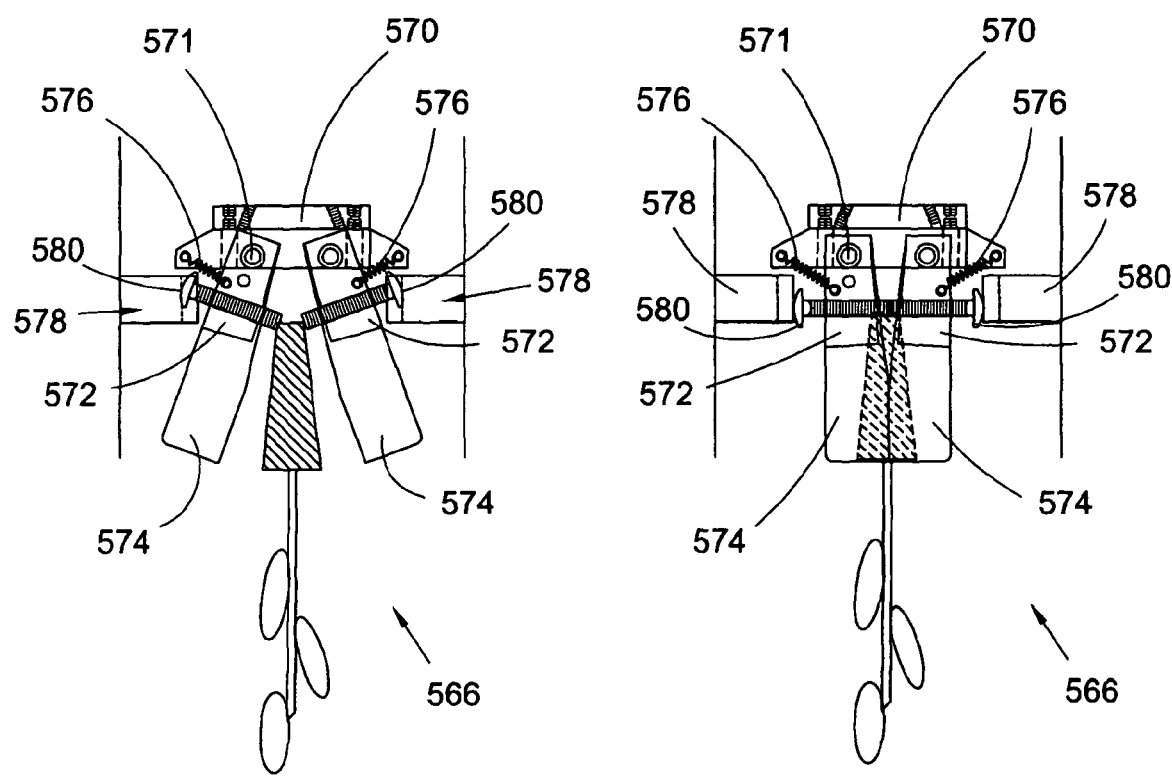
FIG. 14 is a view from the left of FIG. 12 illustrating a pair of gates to prevent a root ball from tipping over, the gates being open in this view.
FIG. 15 is a view similar to FIG. 14, but with the gates closed.

There is a tendency for the rear root ball to fall down towards the rear when the seedling extraction spears 364 and 366 are positioned in their lowered position shown in FIG. 7. Therefore, a tip-up gate assembly 566 is provided in the seedling loader group, the tip-up gate assembly being best shown in FIGS. 9, 12, and 14-15. The gate assembly 566 includes front and rear mounting bars 568, 570 (FIG. 12). Pivotally secured to the mounting bars by pivot pins 571 are gate mounting plates 572, each of which carries a gate 574. The pair of gates 574 are normally spring biased to their open position shown in FIG. 14 by tension springs 576. However, when the seedling loader group is moved to the fully extended position shown in FIGS. 9 and 15, the gates will be moved to their closed position when cam or ramp 578 is engaged by cam follower 580, causing the gates to bear against the rear root ball, moving it to an upright position before it is grasped by the seedling loader group. When the seedling loader group 500 is moved from the fully extended position shown in FIGS. 9 and 15 to the fully retracted position shown in FIGS. 10 and 14 by operation of the air cylinder 544, the cam followers 580 will move from the FIG. 15 position to the open position shown in FIG. 14. As the rear root ball is now held by the root ball loader 502, 504, it will remain in the upright position until it is released onto the gap up belts. When the seedling loader group 500 is in the fully retracted position shown in FIG. 10, the sheet metal structures 502, 504 will be opened. At this point the root balls will drop onto the gap-up belts 506 and 508.

FIG. 9a shows a plurality of root balls delivered to a gap-up mechanism. In this view, there is a gap between adjacent root balls. However, as the gap-up belts are continuously running, the gap between the root balls will quickly be closed as can be seen from an inspection of FIG. 10, the closure being achieved as the root balls are forced against each other, the rearmost root ball being held by cut-off gate 510.

Intermediate portions of the gap-up belts 506, 508 are supported by longitudinally extending high density polypropylene strips 600 carried by longitudinally extending bars 602 which are in turn carried by supports 604. The supports 604 are secured to right and left plates 516, 518.

The gap-up belts are driven continuously during the operation of the machine by a DC motor 606 suitably mounted on the upper plates 516, 518. A cogged drive sheave 608 is mounted on the output shaft of the motor. A cogged belt 610 passes over the drive sheave 608 and driven cogged sheaves 612 and 614, sheave 614 being secured to cross shaft 615. An idler sheave 616 maintains tension in the belt. The sheave 612 is mounted on a cross shaft 618 suitably journalled in right and left upper plates 516 and 518, the cross shaft in turn carrying right and left drive sheaves 620 and 622 over which right and left drive belts 624, 626 are passed, these belts in turn driving the right and left gap-up belts 506 and 508.

Figure 11:
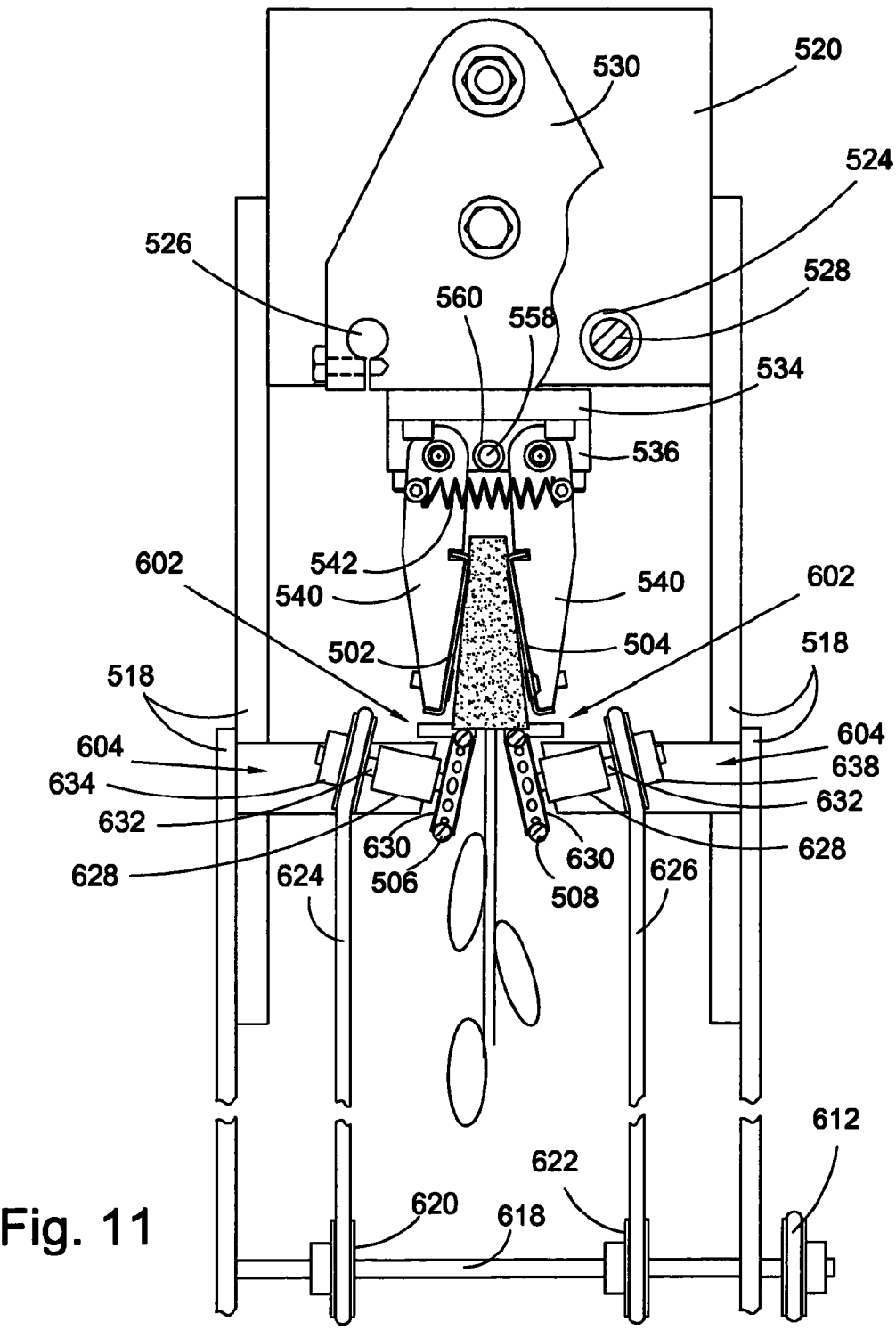
FIG. 11 is a view of a portion of the structure shown in FIG. 9a, this view being taken from the left end of FIG. 9a, or from the front of the apparatus.

The longitudinally supporting bars 602 also support the front and rear sheaves over which the gap up belts pass. To this end front and rear offset bar extensions 628 are provided, each of which extensions is of a L-shape. A side of the L-shaped bracket 628 is bolted as at 630 to an end portion of the bar 602, as indicated in FIG. 11. A rotatable shaft 632 passes though a portion of the L-shaped extension beyond the bar 602. Mounted on the end of the shaft are driven and drive sheaves 634, 638, the driven sheave being driven from drive sheave 620 or 622 via a belt 624 or 626, and the drive sheaves 636 in turn driving the gap-up belts 506 and 508.

The cut-off gate 510 has the function of stopping the lead root ball so that next trailing root ball will press against the leading root ball, thus eliminating any gaps. In addition, the cut-off gate will be operated to release root balls at precise intervals to insure that proper spacing may be achieved. In the illustrated embodiment the single cut-off gate on the feeder head is operated by a pair of double acting air cylinders 680 which are supported for adjustable longitudinal fore and aft movement by a carriage 682 supported for adjustable movement on a pair of longitudinally extending rods 684 which are in turn supported by plates 686. The plates are in turn supported on the right and left upper plates 516, 518 in any suitable manner. A screw mechanism including a screw 688 and a knurled wheel 690 may be used to adjust the position of the gate to accommodate root balls of differing diameters. Thus, differing nurseries use plant trays having differing sized cells.

Discharge Mechanism

Figure 16:
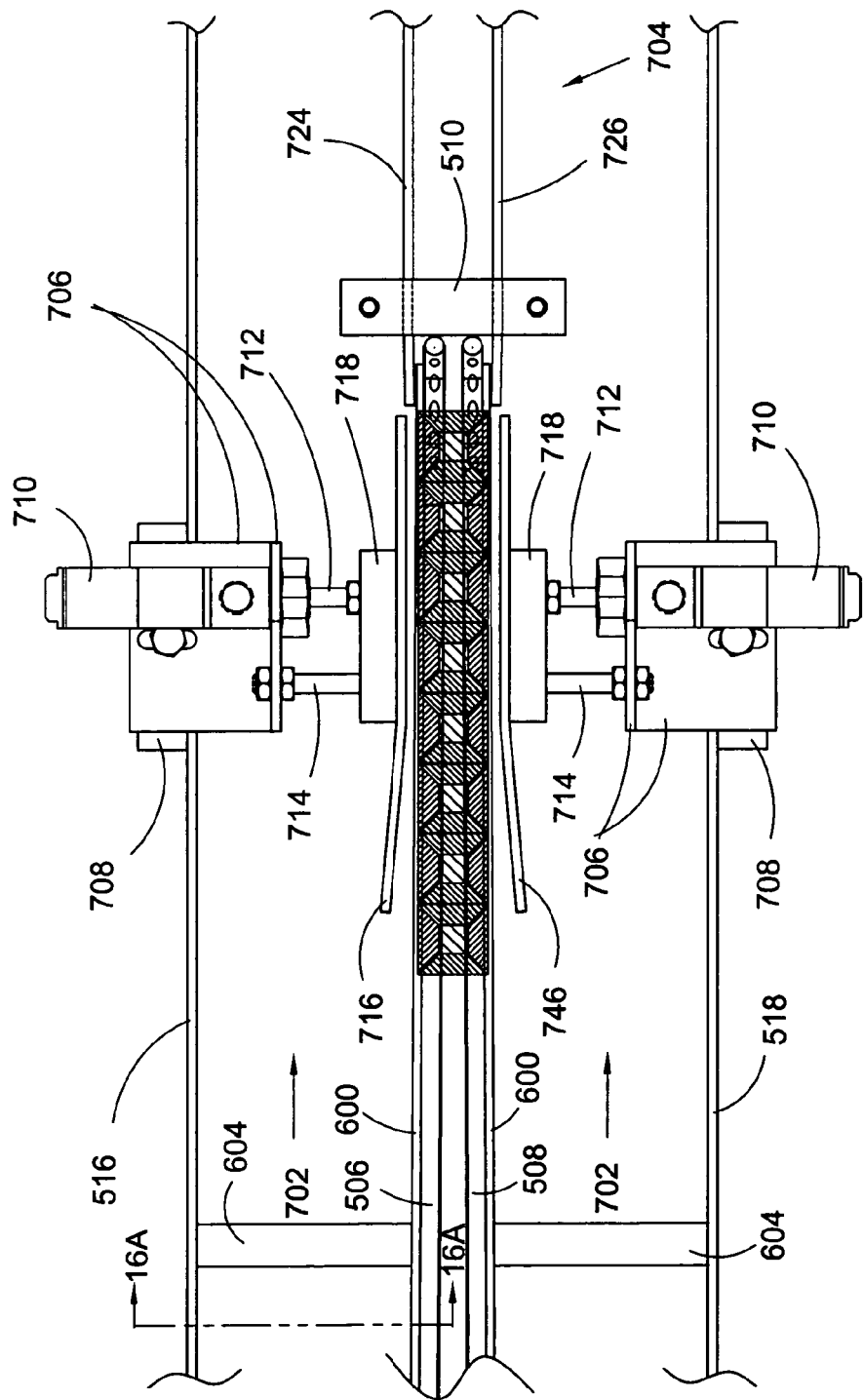
FIG. 16 is a plan view of root ball pinchers.
Figure 16A:
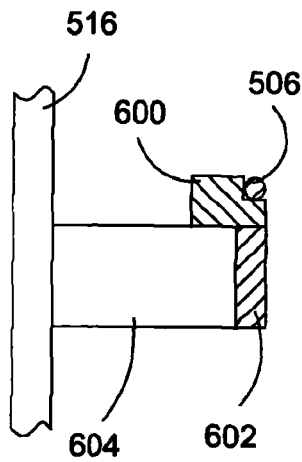
FIG. 16a is a section taken generally along the line 16a-16a in FIG. 16.
Figure 17A:
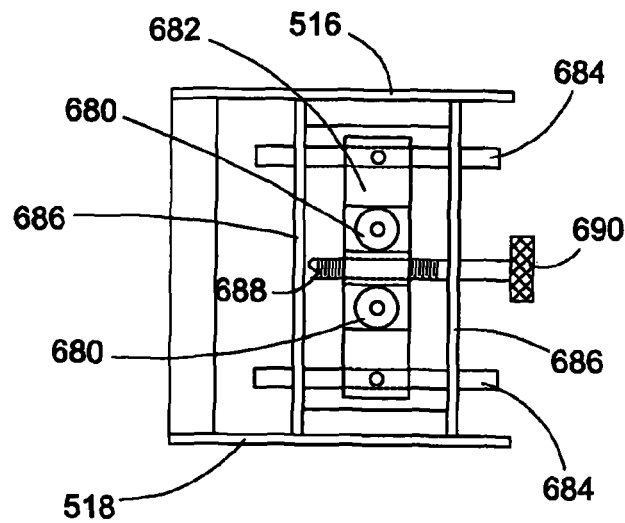
FIG. 17A is a top view of a portion of the structure shown in FIG. 17.
Figure 17:
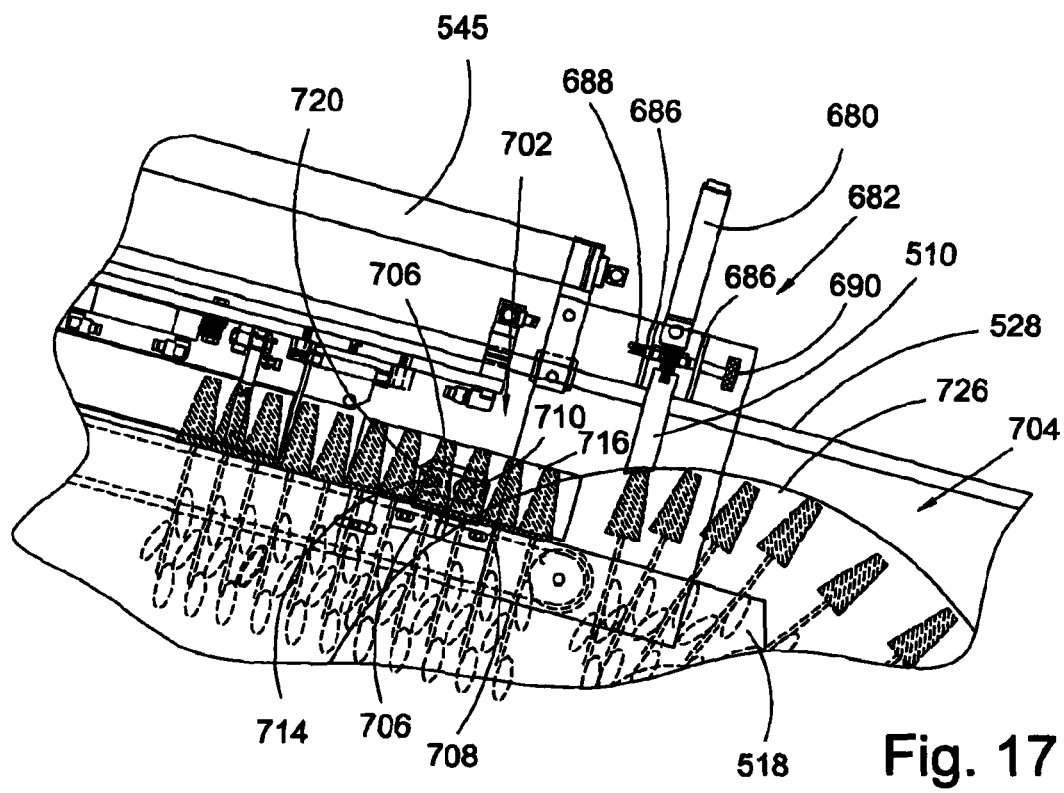
FIG. 17 is an enlarged view of a portion of FIG. 9 showing how a seedling is lifted up and away from the gap eliminating subassembly by the discharge mechanism, this view also illustrating the progressive movement of a seedling after it has been lifted up and away from the gap eliminating subassembly, and further showing the cut-off gate in its raised position after the seedling has been lifted up and away from the gap eliminating subassembly.

The principal components of the discharge mechanism are root ball pinchers, indicated generally at 702 (FIG. 16), which act in concert with the gate 510, and a feeder pinch disk assembly or discharge disk assembly 704. Right and left root ball pinchers 702 are mounted on the upper edge of the right and left upper plates 516 and 518, respectively. To this end, each of the root ball pinchers includes a L-shaped bracket 706 secured to a bar 708 secured to an upper end of the side plate 516 or 518. The cylinder 710 of a double acting air cylinder assembly is secured to the L-shaped bracket, the rod 712 passing through, the root ball pinchers 702 being secured to the rod. A guide rod 714 also extends from the L-shaped bracket. Each root ball pincher includes a flared pressure plate 716 mounted on a block 718. The block 718 is secured to the rod 712, and is provided with a suitable slot 720 or aperture for sliding receipt of the guide rod 714. Simultaneous actuation of the cylinder assemblies 710, 712 will cause opposed root ball pinchers in the form of the pressure plates 716 to either move towards each other to pinch and hold the root balls from further movement, or to release the root balls so that they can be advanced. The pressure plates are flared to a more open position towards the spears, so that as the root balls are advanced towards the discharge disk assembly they will not catch upon the ends of the plates, but will easily slide in.

The discharge disk assembly 704 includes right and left flexible high density polyethylene plastic disks 724, 726 which are suitably mounted for continuous rotation with driven shaft 615 (FIG. 18A), the shaft being driven by cogged belt 610 which passes over cogged sheave 614. (While the disks may be made of polypropylene, other suitable materials may be employed.) The shaft 615 is journalled in right and left bearings 728, 730 carried by right and left side plates 516, 518, respectively. A mounting block 732 is secured to shaft 615 for rotation therewith, the block being located midway between the side plates. The disks 724 and 726 are suitably secured to the mounting block by conventional fasteners.

Means are provided to shape the disks as they are rotated in a clockwise direction as viewed in FIG. 9. Thus, the disks are flexible and can move from side to side, and when forced towards each other they have the ability to grasp a root ball when the gate 510 is moved up to release a single seedling, the others being held by the root ball pinchers. In order for the disks to be able to engage and transport seedlings, they are forced to together by three opposed pairs of rollers 750, 752, and 754, respectively. To this end each pair of rollers is carried by suitable leaf springs 756 which are in turn carried by suitable mounts 758 secured to the side plates 516, 518.

Figure 19:
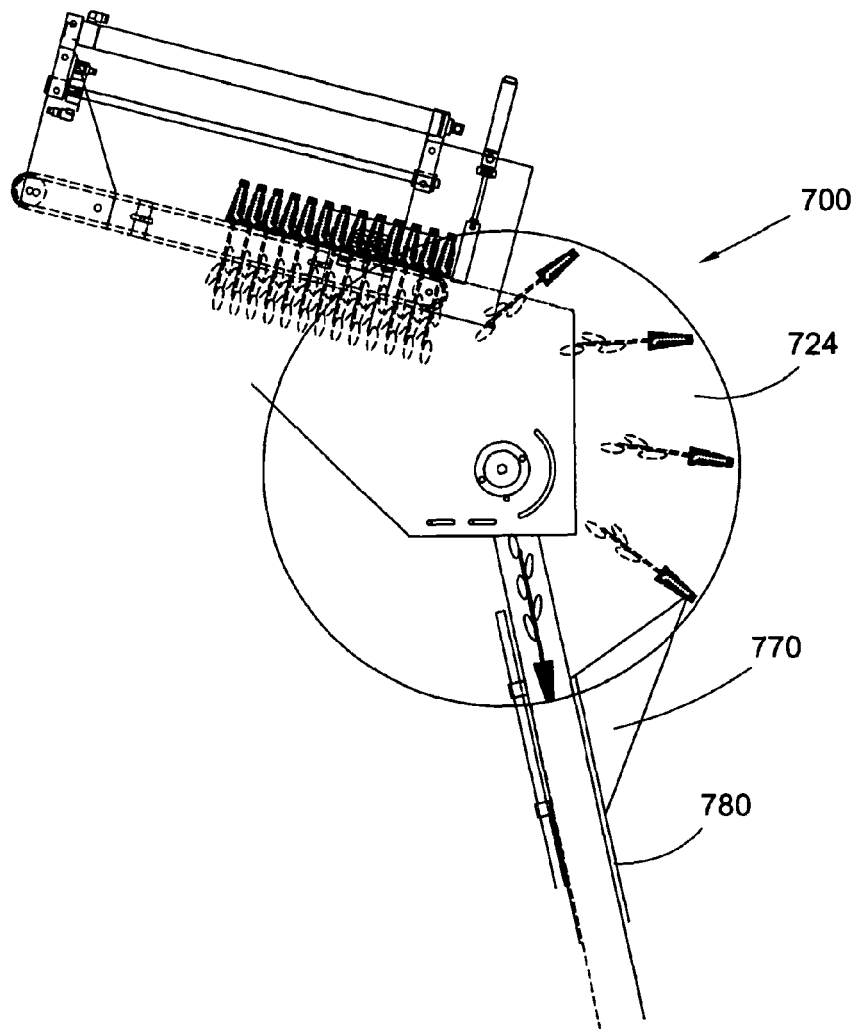
FIG. 19 is a view showing a plant, including a root ball, stem and leaves, being discharged from the discharge mechanism.
Figure 20:
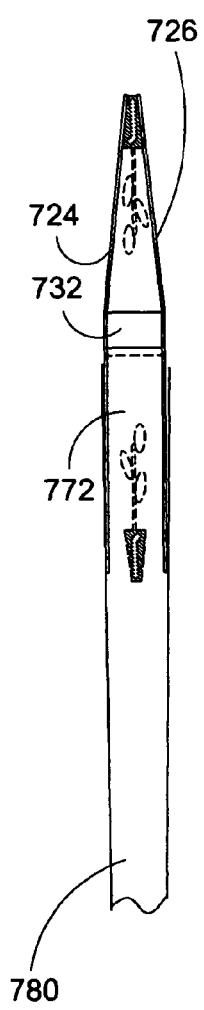
FIG. 20 is an end view of FIG. 19.

A drop tube assembly including a funnel like structure 770 is suitably mounted below the disks 724, 726 for the receipt of seedlings, the drop tube assembly terminating in a drop tube 780. In order to release the seedlings, and to insure that they do not stick to the disks, a disk release member 772 extends between the disks 724, 726 as can be seen from FIGS. 18A, 19 and 20. As the disks are rotated in a clockwise direction as viewed in FIG. 19, the rollers and leaf springs will force the disks together to cause them to grasp and raise a seedling away from the gap-up belts at the area of the gate, and to transport them to a drop zone where they are caused to drop by gravity as the disks are forced apart by the disk release member 772. In addition, a flow of air directed by air jet 774, will facilitate the discharge. A second flow of air from air knife 776, which is connected to manifold 778, will prevent leaves from adhering to the rear side of the funnel 770.

Row Unit Planter Frame Subassembly

Figure 21:
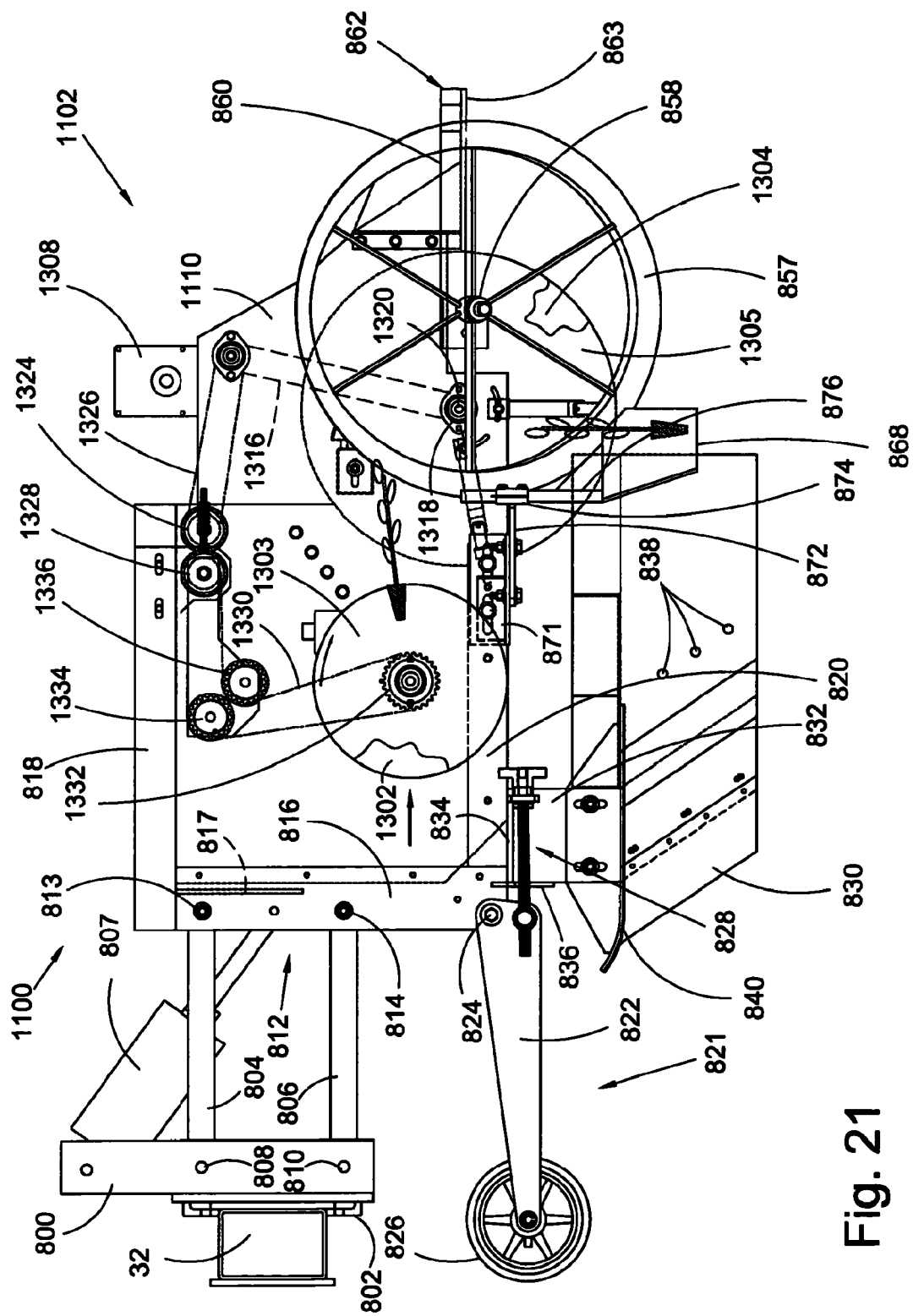
FIG. 21 is a side view of the planter subframe and plant feeder subassembly showing the transfer disks in a rear position adjacent planting disks which are disposed between a pair of press wheels.
Figure 22:
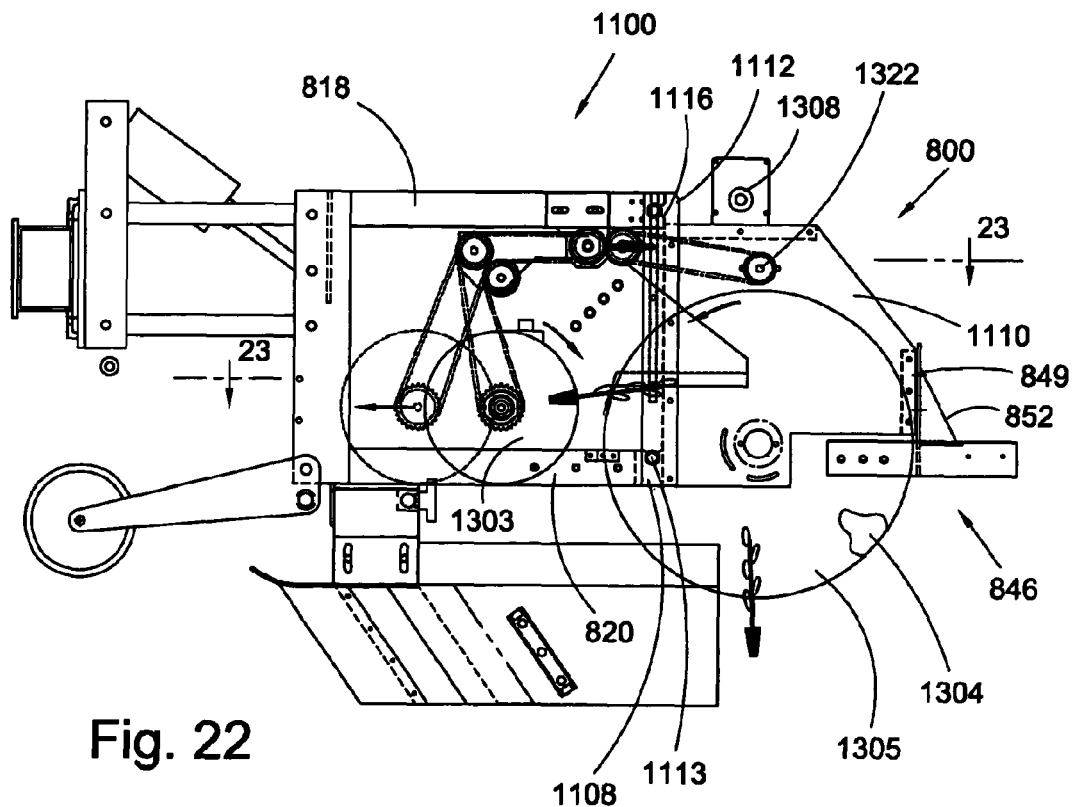
FIG. 22 is a view similar to FIG. 21, but showing how transfer disks of the plant feeder subassembly may be moved between forward and rear positions to accommodate seedlings having different stem and foliage lengths, the press wheels not being shown in this view.
Figure 23:
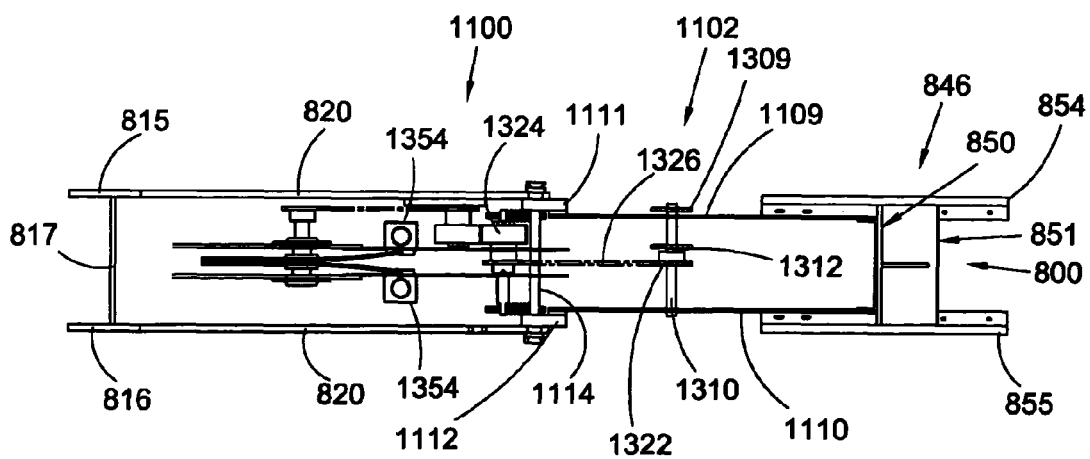
FIG. 23 is a sectional view of the apparatus shown in FIG. 22, this view being taken generally along the line 23-23 in FIG. 22.

The row unit planter frame subassembly 800, best shown in FIGS. 21 and 22, is adapted to be secured to the tool bar 32 shown in FIG. 1. The subassembly includes a mounting weldment 802 which may be secured to the tool bar in any conventional manner. Upper and lower parallel links 804 and 806 are pivotally secured to the weldment by front upper and lower bushing assemblies 808 and 810. The rear ends of the upper and lower links are pivotally secured to a further weldment indicated generally at 812 by upper and lower rear bushing assemblies 813 and 814. The weldment 812 includes right and left vertically extending side bars 815 (FIGS. 23) and 816, an upper transverse plate 817 and a lower angle iron (not illustrated), the parts being welded together. Welded to the upper and lower ends of side bars 815 and 816 are right and left horizontal rearwardly extending upper and lower bars 818 and 820, respectively. In addition a cylinder 807 is mounted between the weldment 802 and the weldment 812 for the purpose of applying either a raising or a lowering force to the weldment 812.

A soil conditioning unit indicated generally at 821 is pivotally secured to the lower end of weldment 812. In the illustrated embodiment the soil conditioner unit includes a pair of arms 822 which are carried by the lower ends of side bars 815, 816 by pivots 824. The forward ends of the arms carry a soil conditioner, such as for example a soil conditioning wheel 826. The height of the soil conditioning unit can be adjusted by an screw mechanism indicated generally at 828, the details of which should be apparent from an inspection of the drawings.

A furrow opener 830 is secured to the weldment 812 by a vertical bar 832 which is in turn secured to a transverse plate 834 and a bracing plate 836, these parts being welded together. The furrow opener is of a generally V shaped construction, the apex of the V being to the forward side, and the spaced apart sides of the V being flared to the upper side. The furrow opener may be provided with various ports 838 for the introduction of water into the soil during planting. Adjustably secured to the furrow opener is a skid plate 840 for flattening the soil immediately before the seedlings are introduced into the soil.

The planter subframe may be split into two parts, a forward subframe indicated generally at 1100 and a rear subframe indicated generally at 1102. To this end upper and lower right and left fore and aft extending frame members 818 and 820 are connected at their forward ends to the right and left side bars 815 and 816, respectively. At the rear ends each of the lower frame members 820 are provided with upwardly extending C-shaped cut-outs 1108. The rear subframe 1102 consists essentially of right and left mounting subassemblies including right and left side plates 1109 and 1110, respectively and right and left vertically extending mounting bars 1111 and 1112, which bars are carried at their lower ends by a transverse pivot shaft 1113 (FIG. 22) which is received in the upwardly extending C-shaped cut-outs 1108. Each of the bars 1111 and 1112 carries a cylindrical rod 1114 which is received in C-shaped cutout 1116 in the upper frame member 818.

A C-shaped bracket 846 is secured to the trailing ends of the side plates 1109, 1110, which bracket supports a press wheel supporting weldment which is secured thereto by suitable bolts 849. The weldment includes a vertical plate 850, rearwardly extending plate 851, and reinforcing gusset 852. Welded to the lower side edges of the plate 851 and to the sides of vertical plate 850 are right and left longitudinally extending press wheel mounting brackets 854 and 855, respectively which are suitably angled to the vertical. Right and left press wheels 856 and 857 are carried by the brackets 854, 855, respectively by suitable shaft assemblies 858, the details of which are not illustrated. Mounted on the brackets 854-855 is a press wheel scraper assembly, which includes right and left mounting tubes 860, 861 suitably secured to the inner sides of the brackets, the tubes carrying at the rear ends a transverse tube 862 provided with suitable press wheel scrapers 863.

The planter subframe assembly further includes right and left knife coulters, only the left coulter 868 being illustrated. These coulters are secured to the horizontal rearwardly extending bars, one of which is shown at 820. To this end, gusseted L-shaped brackets 871 are provided, each having elongated horizontal slots through which suitable bolts pass, the slots permitting adjustment of the brackets in a fore and aft direction. Disposed below each of the brackets is a horizontal slotted bar 872 provided with an elongated slot (not shown) through which are passed suitable bolts for adjustably securing the bars in place. The horizontal bars each carry mounting brackets 874 through which pass cylindrical shafts 876 which carry at their lower ends the knife coulters. While knife coulters are illustrated it should be apparent that other forms of coulters may be employed, for example disk coulters.

Plant Feeder Subassembly

Figure 1B:
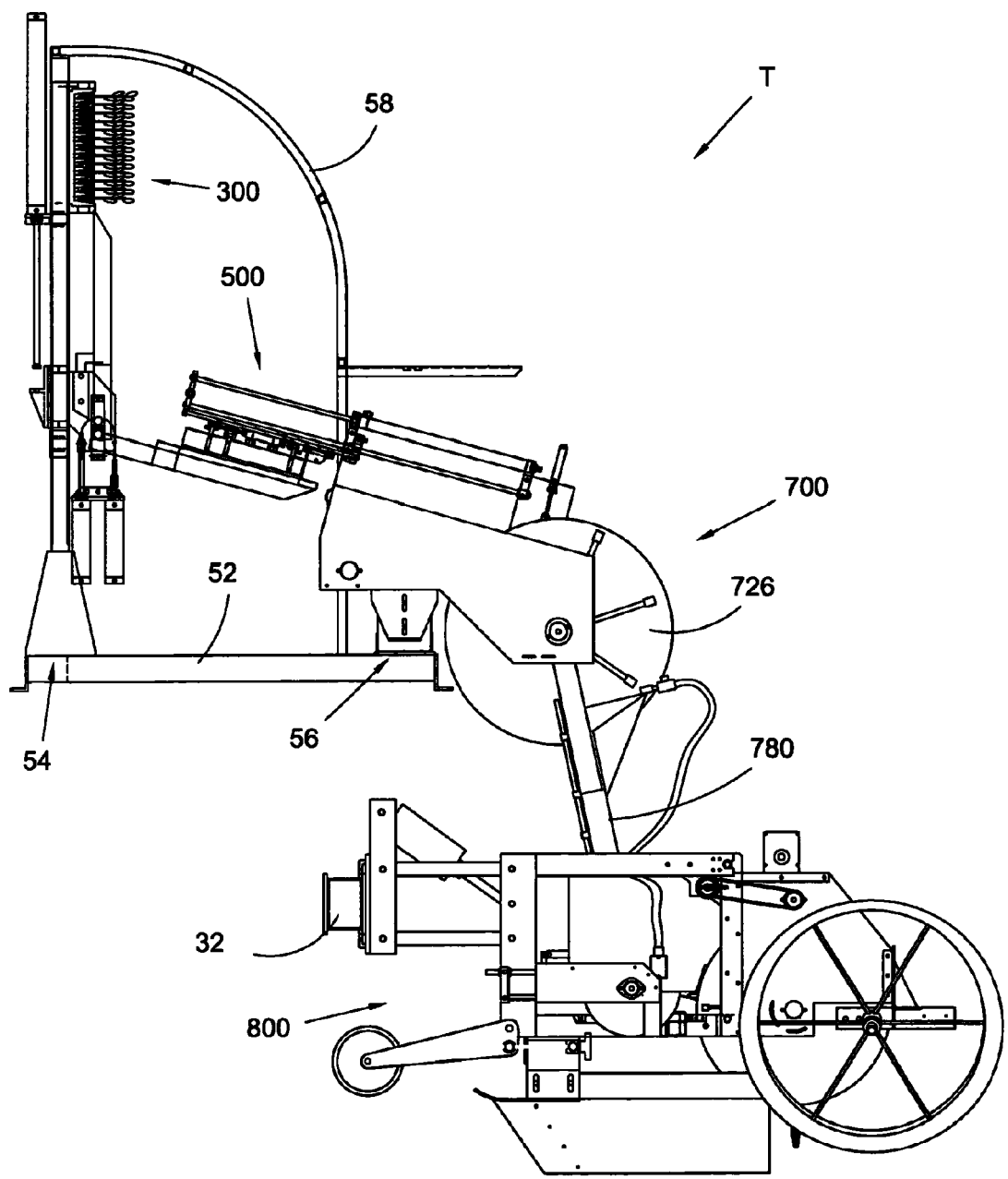
FIG. 1B is a view similar to FIG. 1A, but showing some of the parts not shown in FIG. 1A
Figure 24A:
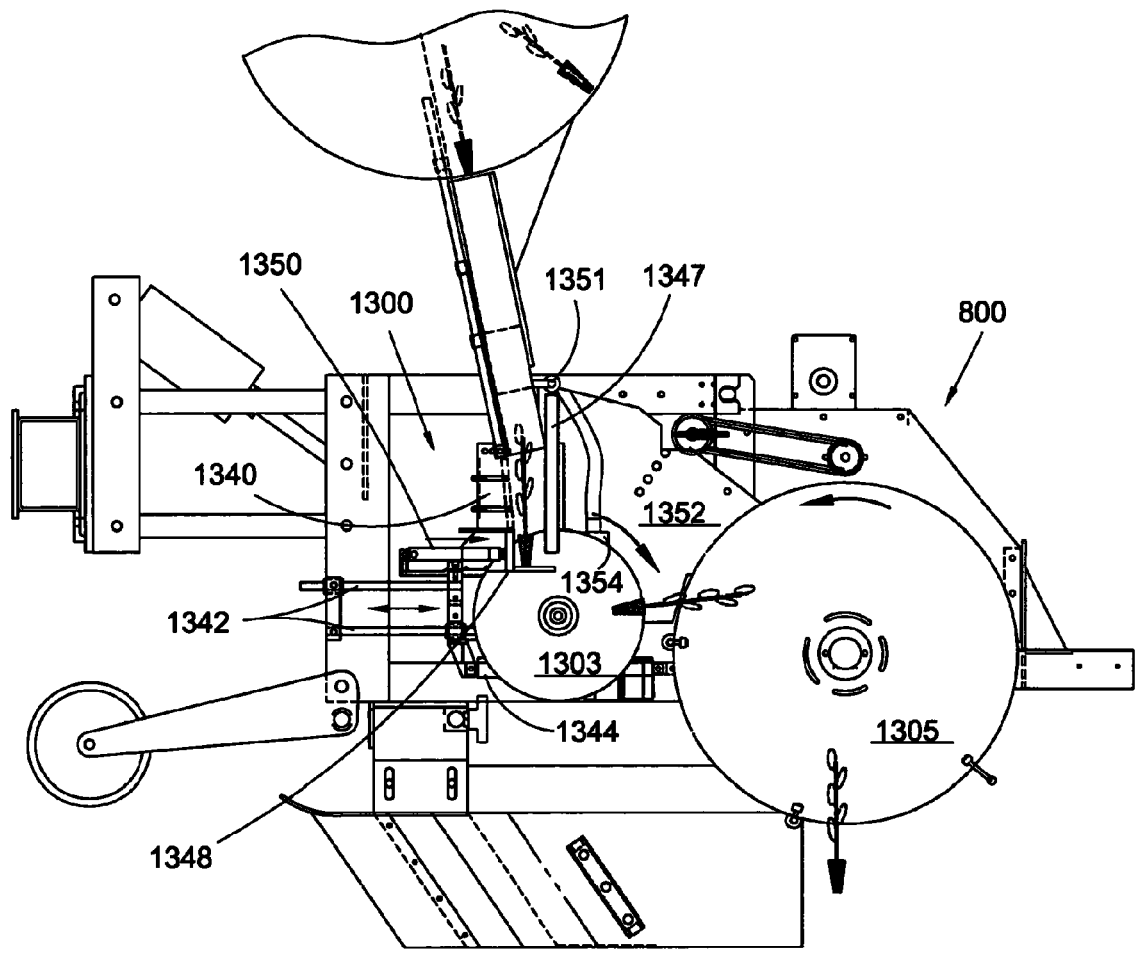
FIG. 24A is a view similar to FIG. 22, but showing the transfer disks in the rear position and showing additional details.
Figure 24B:
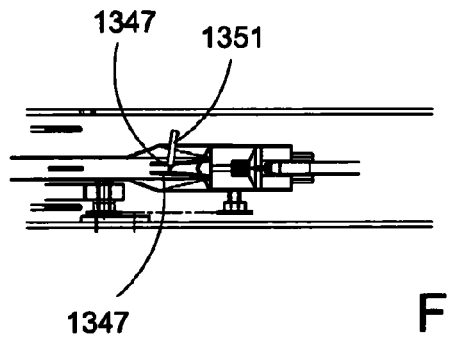
FIG. 24B is a partial sectional view showing the double doors to the rear of a root ball kicker.
Figure 25:
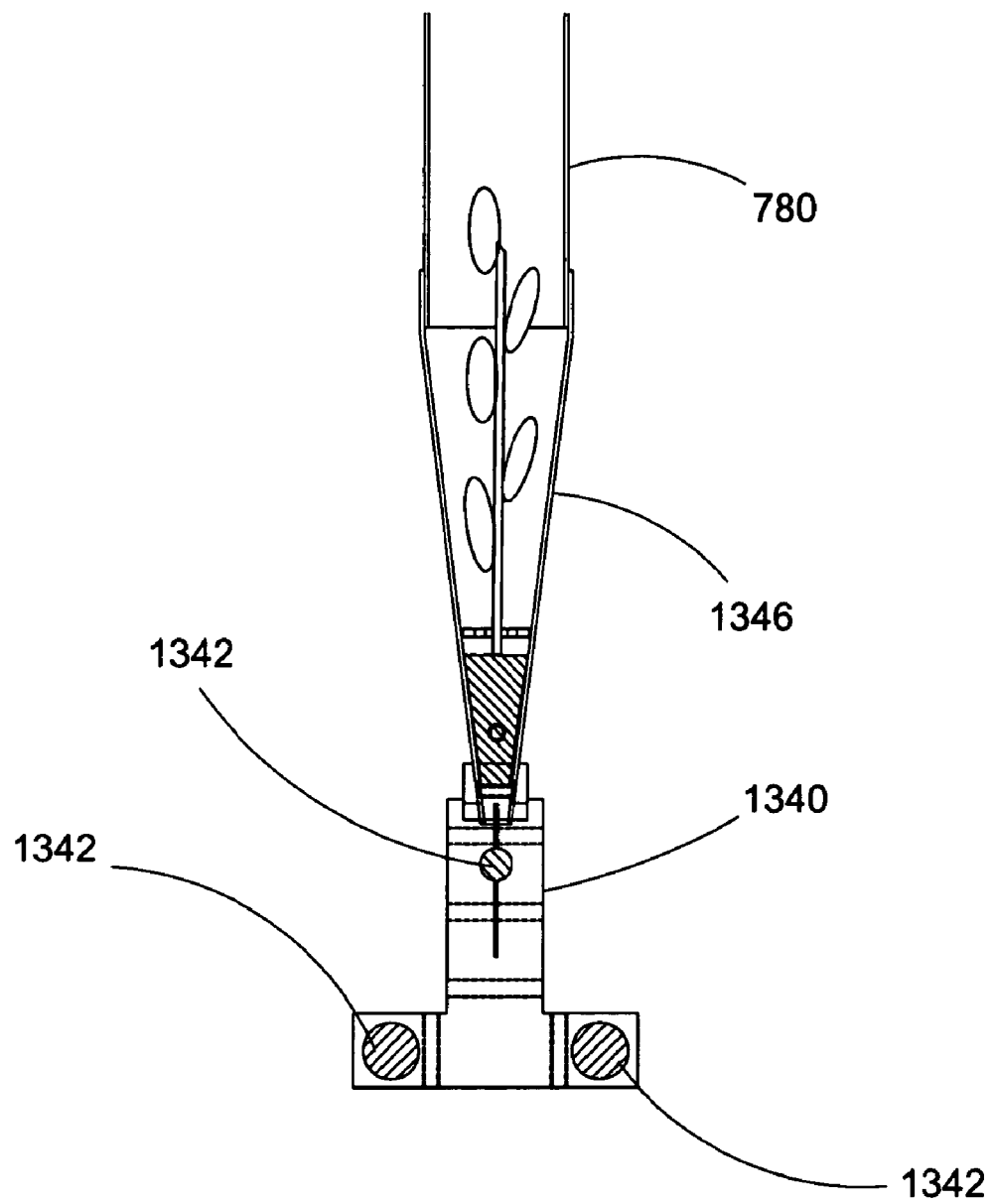
FIG. 25 is an end view of a seedling inside the seedling receiver which is between the transfer disks.

The plant feeder subassembly 1300 of this invention is mounted immediately below the drop tube 780 as can best be seen from FIGS. 1B and 24. The planter feeder includes as its principal components right and left forward transfer disks 1302 and 1303, respectively, and right and left rear planting disks 1304 and 1305, respectively. Each of these disks is of a construction similar to the disks 724, 726, however the forward transfer disks are ½ the diameter of the rear planting disks. To this end both sets of disks are driven in such a manner that they have the same peripheral speed.

The drive for the disks includes a motor 1308 mounted on the right and left side plates 1109 and 1110, which motor drives a cross shaft 1310 carried by suitable bushings on the side plates, the motor driving the shaft through a suitable chain (not shown) and sprocket 1309. A pair of drive sprockets 1312 and 1322 are mounted on the shaft for rotation therewith. Sprocket 1312 has a suitable chain 1316 disposed over it, which chain is also disposed over another sprocket 1318 carried by a cross shaft 1320 carried by suitable bushings mounted on the right and left side plates 1109 and 1110. Mounted on the cross shaft for rotation with the shaft is a planting pinch disk assembly including left and right rear planting disks 1304 and 1305. The sprocket 1322 drives a gear 1324 through a further chain 1326. The gear 1324 is carried by extensions of the side plates 1109 and 1110 of the rear subframe 1102 and can be moved away from the forward subframe 1100. When the rear subframe is in its operational position shown in the various figures, it will engage a further gear 1328. This gear will in turn cause the left and right transfer disks 1302 and 1303 to be rotated. To this end, a chain 1330 drives a sprocket 1332 on the shaft which carries the disks 1302 and 1303, causing the disks to be rotated. The chain also passes over idler sprockets 1334 and 1336 carried by a pivoted beam 1338. By properly dimensioning the various sprockets, the peripheral speed of the disks 1302 and 1303 can be the same as the peripheral speed of the planting disks 1304 and 1305 to facilitate the handoff of seedlings from the transfer disks to the planting disks.

Figure 26:
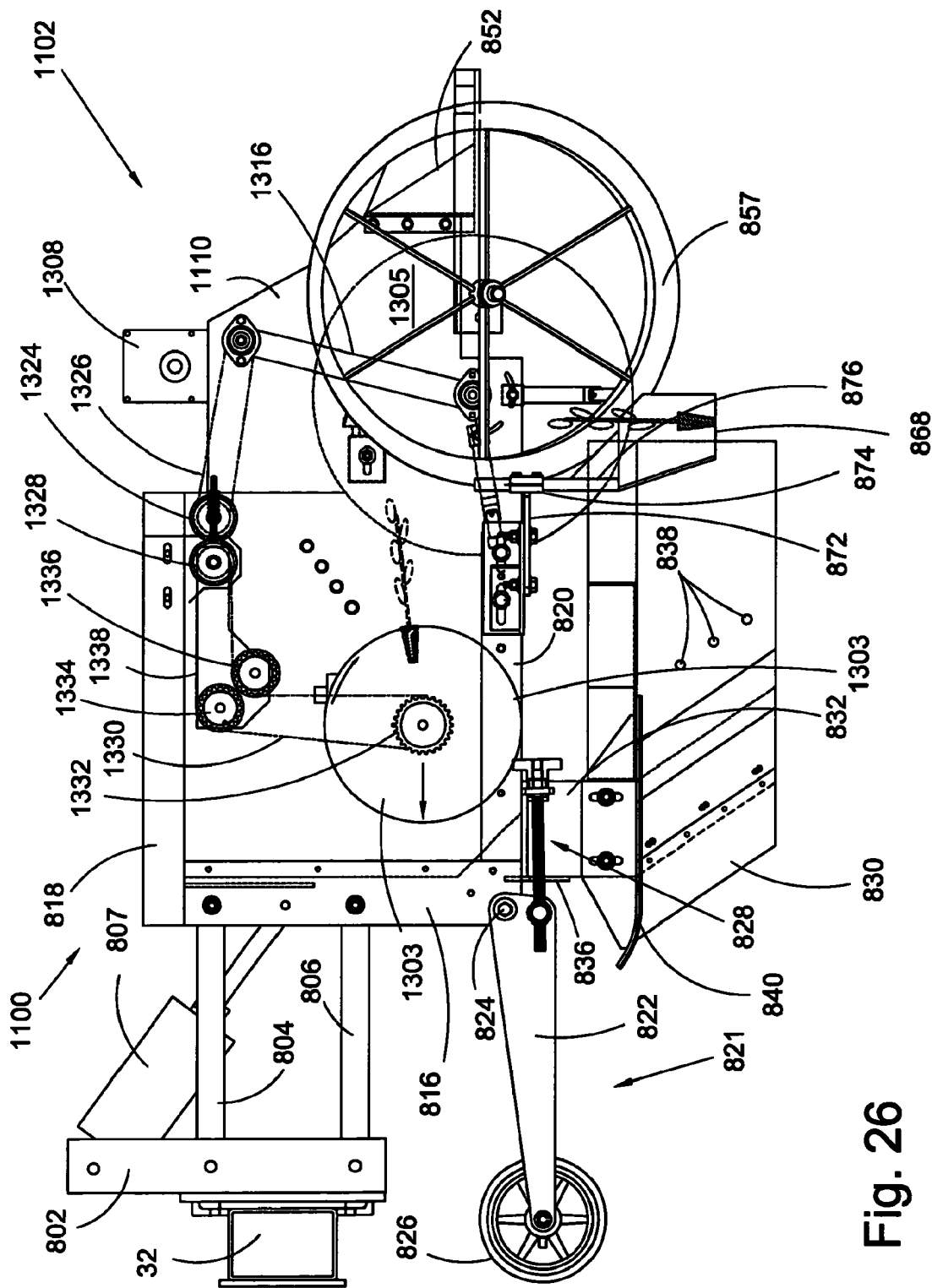
FIG. 26 is a view similar to FIG. 21, but showing the transfer disks in their forward position.
Figure 27:
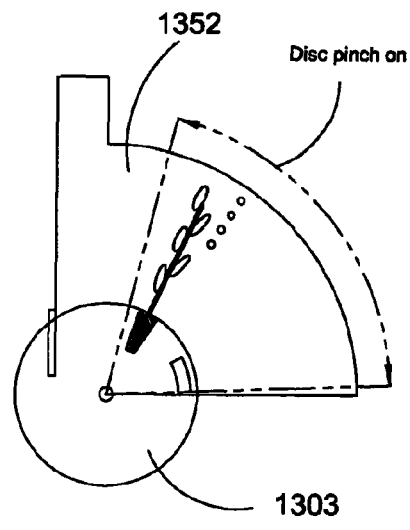
FIGS. 27-30 show various transfer disks characteristics, FIG. 27 showing where the transfer disks are engaging the root ball of the seedling, FIG. 28 showing the air knife effective area, FIG. 29 showing where the transfer disks are held open so they may receive individual seedlings for transfer, and FIG. 30 showing where the air knife performs a foliage correction.
Figure 28:
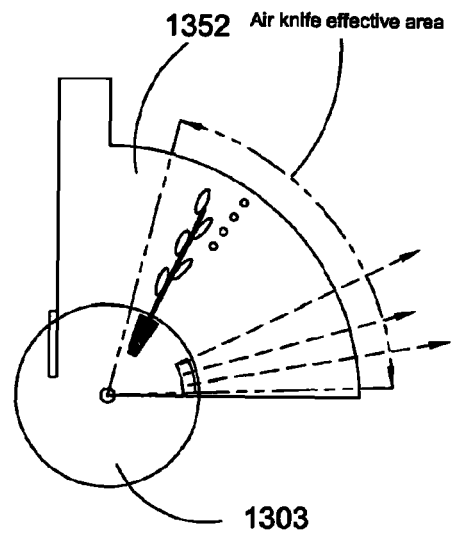
Figure 29:
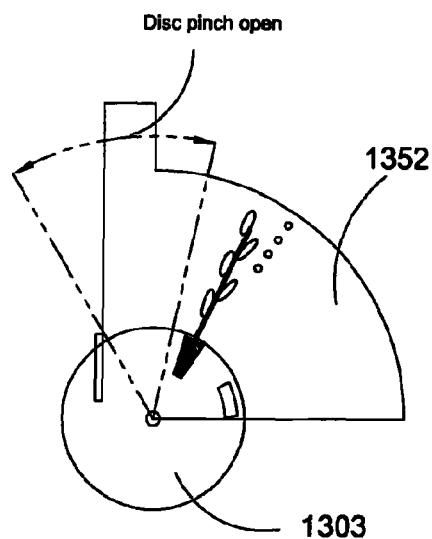

As can be seen from FIG. 22, the seedling disks can be moved between forward or rear positions through various intermediate positions, not shown. Thus when the seedlings are short, the transfer disks should be in the position shown in FIG. 24A, but when the seedlings have a greater height, the disks should be in a forward position as shown in FIG. 26. To this end the transfer disks are supported on a slidable subassembly 1340 which moves on an upper and two lower slide shafts 1342. For and aft movement is caused by a screw servomotor 1344 which may be controlled by the operator. Mounted on the subassembly 1340 is a V-shaped seedling receiver 1346 which extends between the transfer disks 1302, 1303. A double door 1347 is mounted to the rear of the seedling receiver and above the transfer disks, the door preventing the root ball, stem, and foliage from tipping to the rear. When desired, a kicker 1348 will be extended by cylinder assembly 1350 to move the seedlings to the rear where the root ball is caught by the transfer disks 1302, 1303 which have the same peripheral speed as the planting disks 1304, 1305. When the kicker 1348 is operated, a double acting cylinder assembly 1351 will cause the double doors 1347 to be opened. After the root ball had been kicked out, and the kicker retracted, the double doors will be shut again by the cylinder assembly 1351. Extending rearwardly from the slidable subassembly 1340 are a pair of sheet metal sidewalls, one of which is illustrated at 1352 in FIG. 24A. These sidewalls each carry an air knife 1354 for the purpose of extending the stems and leaves at the time of transfer from the transfer disks to the planting disks.

Operation

Figure 30:
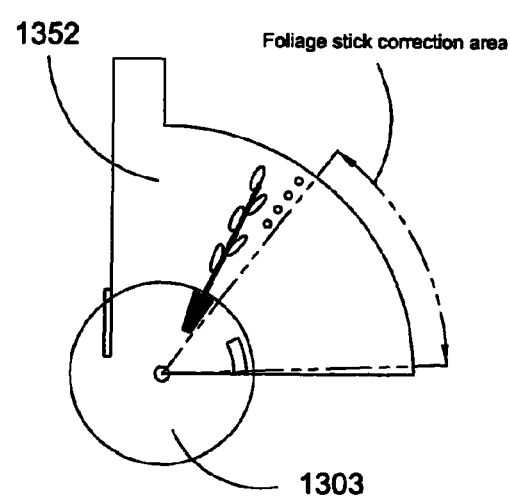
Figure 31A:
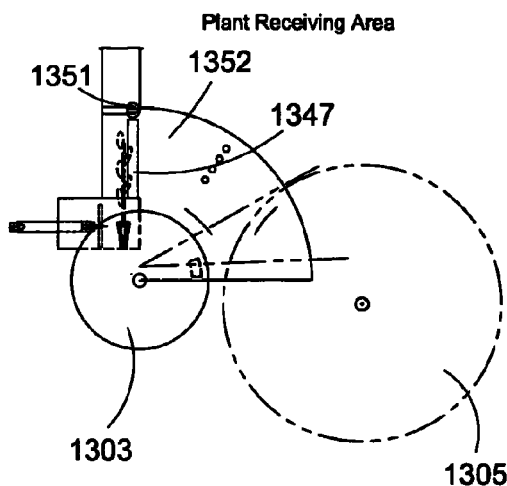
FIGS. 31A-31D show how a seedling is transferred from the seedling receiver to the planting disks.
Figure 31B:
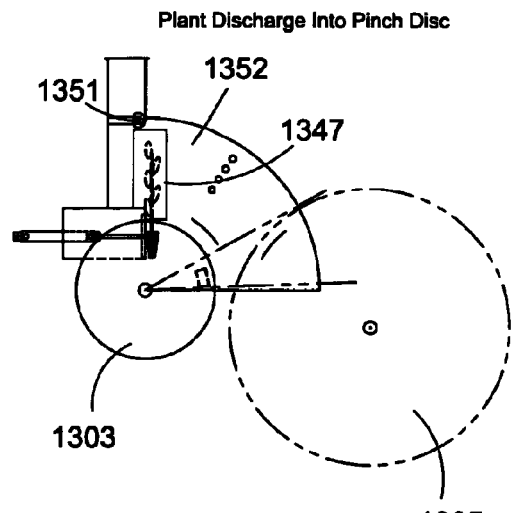
Figure 31C:
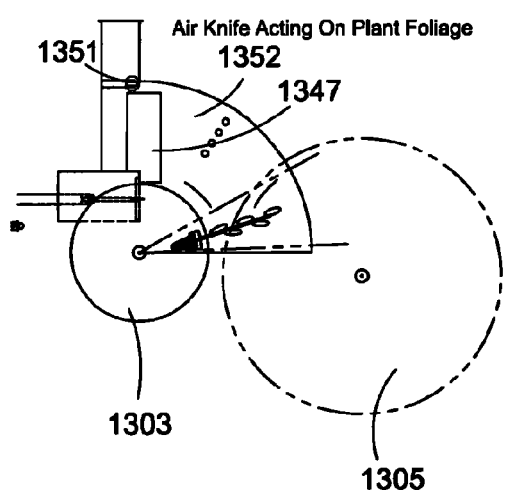
Figure 31D:
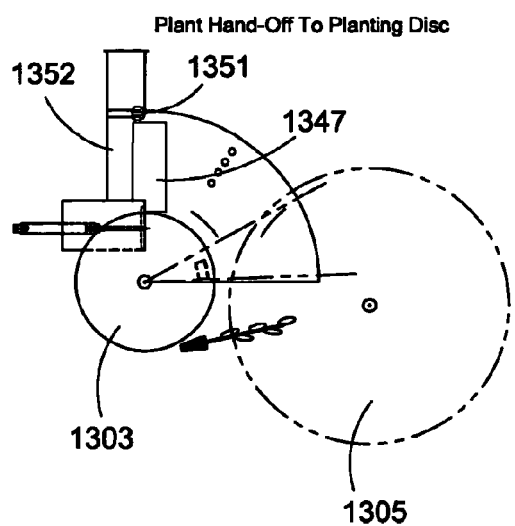

The tray indexing mechanism will properly position a tray so that the subassembly 300 for picking up an entire row of seedlings from a tray can transfer those seedlings to the subassembly 500 for eliminating gaps between seedlings. The discharge mechanism 700 includes a feeder pinch disk assembly 724, 726, will pick up and drop individual seedlings to a drop tube 780 for receipt by a planter assembly. With reference now to FIG. 25 and FIGS. 31A-31D, the seedling will be dropped into the V-shaped seedling receiver 1346. When desired, as shown in FIG. 31B, the kicker 1348 will be extended by cylinder assembly 1350 to move the seedling to the rear where the root ball is caught by the transfer disks 1302, 1303 which have the same peripheral speed as the planting disks 1304, 1305. As the seedling carried by the transfer disks moves in a clockwise direction as viewed in these figures, the opposed air knifes acting in the foliage stick correction area shown in FIGS. 30 and 31C, will cause the foliage and stem to be extended so that the seedling can be effectively engaged by the planting disks and then moved in a counter-clockwise direction. When the root ball of the seedling is in the proper position in the furrow, the press wheels will cause it to be held by the ground. In operation, about 2 seedlings will be serially planted every second by each row unit of this transplanter.

Controls

Figure 32:
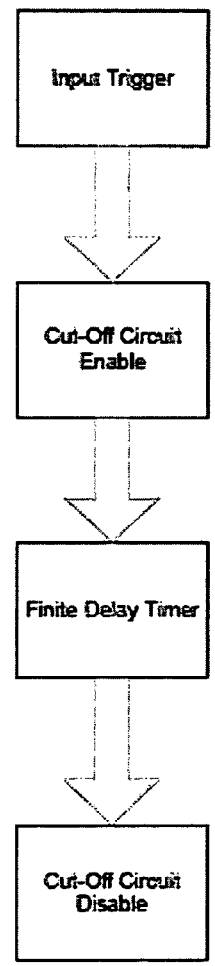
FIGS. 32-36 show various flow charts relevant to the operation of this apparatus.

FIGS. 32-36 show various flow charts relevant to the operation of this apparatus. The movement of the spears is controlled in part by the reload execution loop set forth in FIG. 32. This control sequence will be triggered from a laser sensor receiver 1000 best shown in FIG. 16. This optical sensor monitor will be monitored as shown in FIG. 32. When the monitor receives a continuous signal from the laser emitter 1002, indicating the absence of a root ball on the gap-up belts, the plant transfer carriage or seedling loader group will be moved from the extended position shown in FIG. 9 to the retracted position shown in FIG. 9a. The seedlings will be released, and the spears will be operated as set forth in FIG. 32. The laser emitter and laser sensor are mounted on brackets 1004, 1006, respectively, which are mounted in turn on the right and left plates 516, 518.

Figure 33:
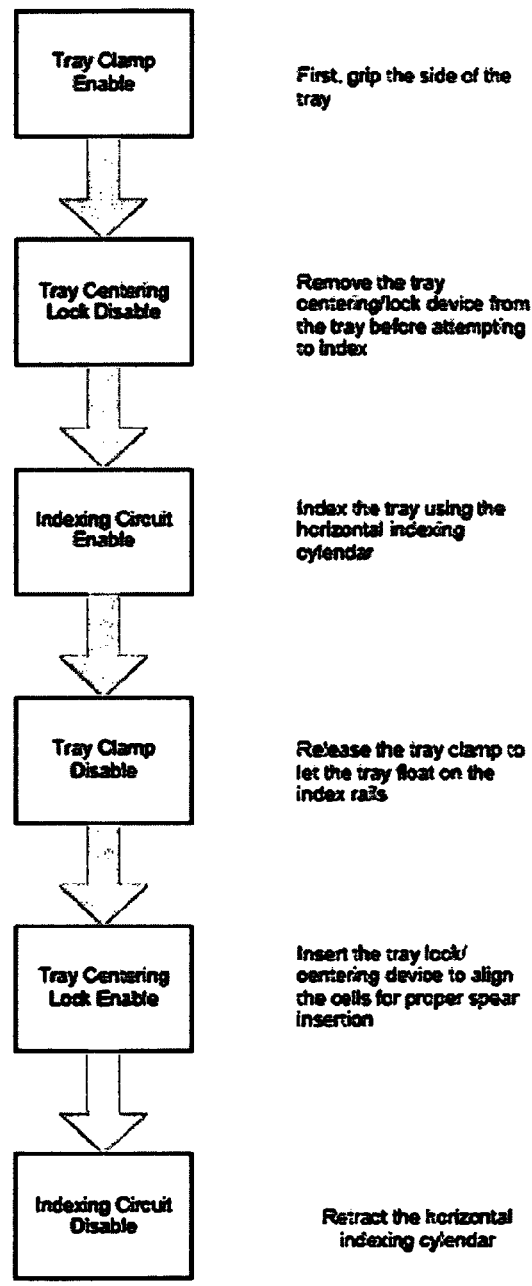

The flow chart of FIG. 33 sets forth the process for indexing the trays. This process will not be initiated until it is called to operate from the reload execution loop set forth in FIG. 32.

Figure 34:
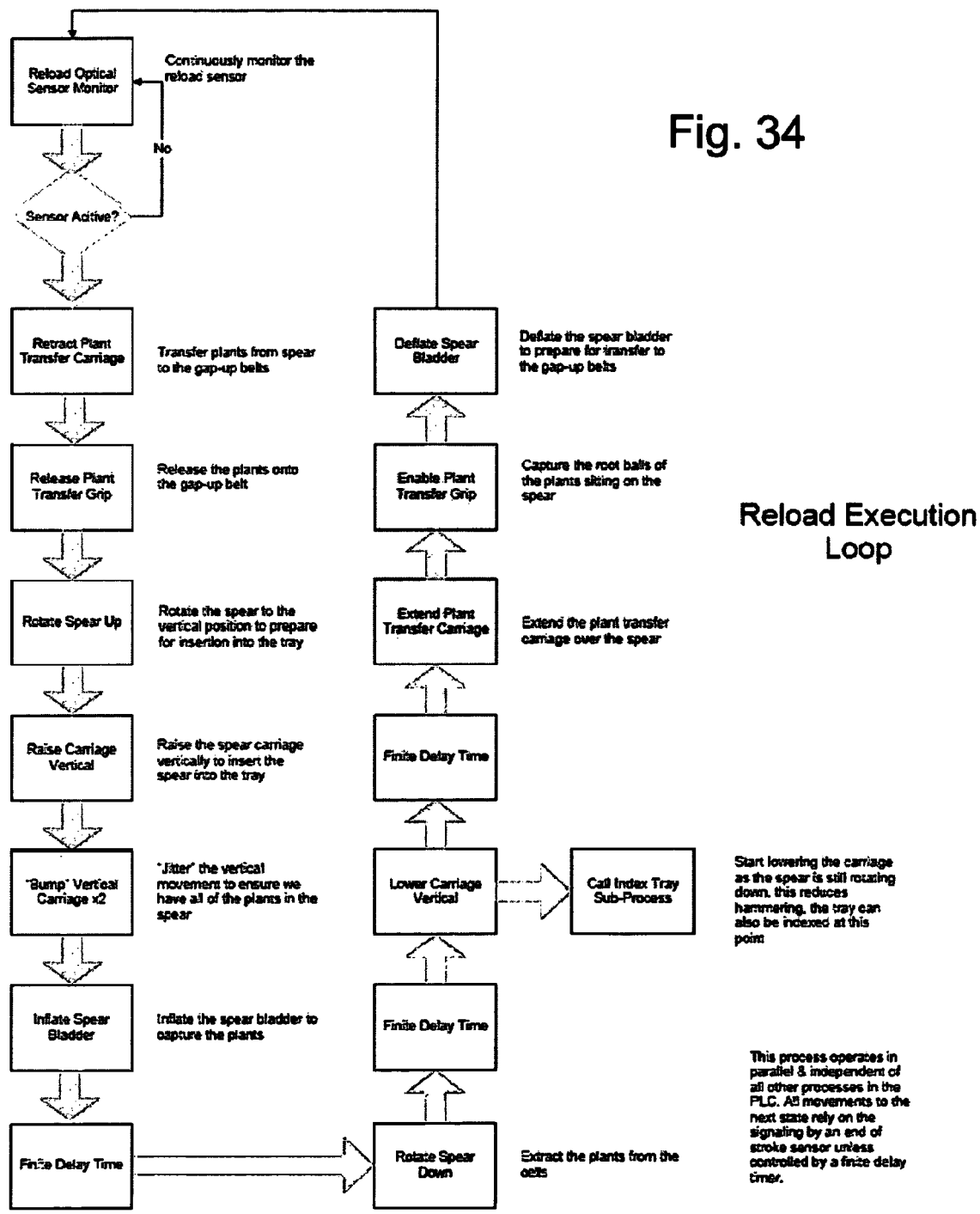
Figure 35:
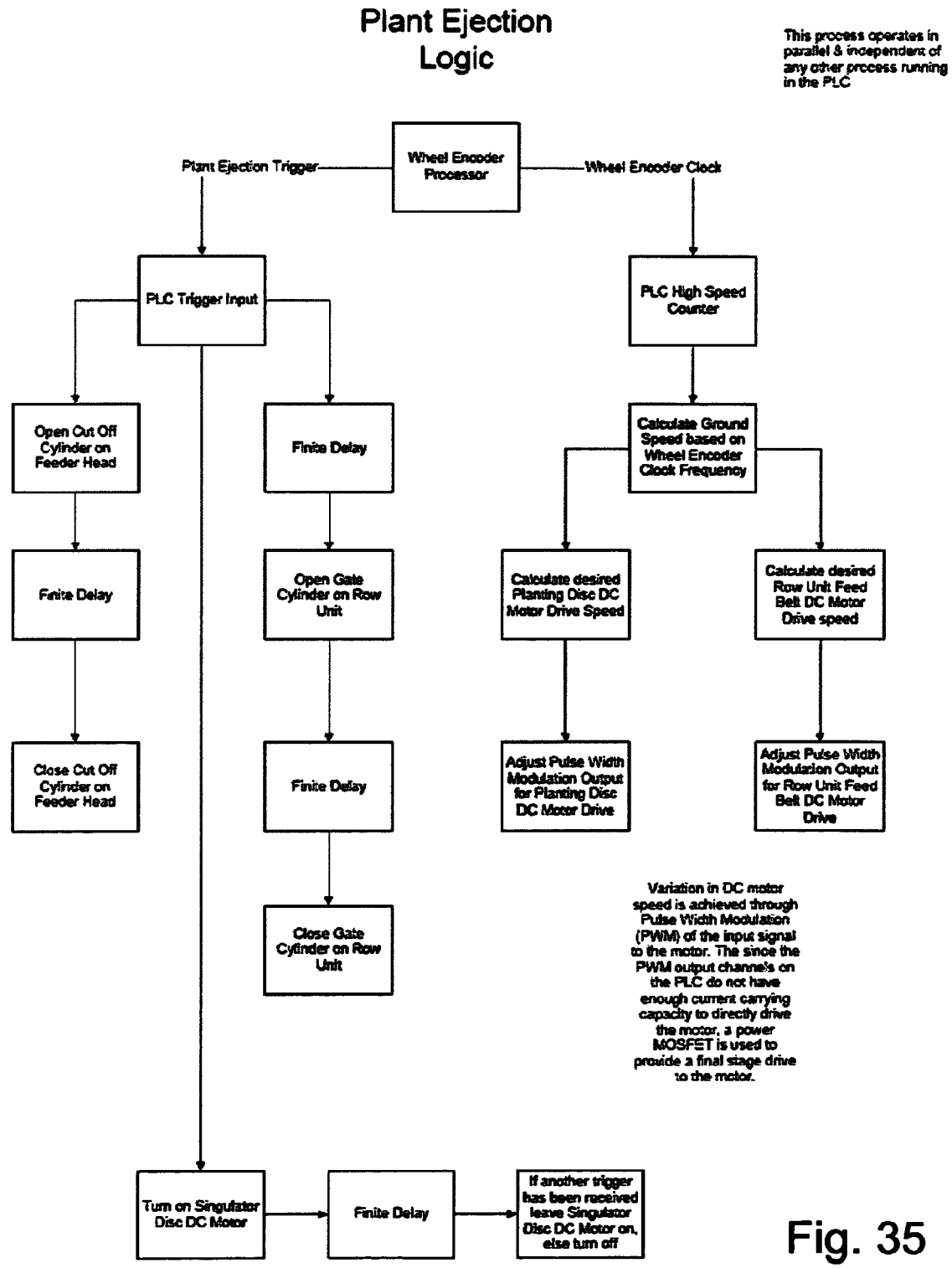
Figure 36:
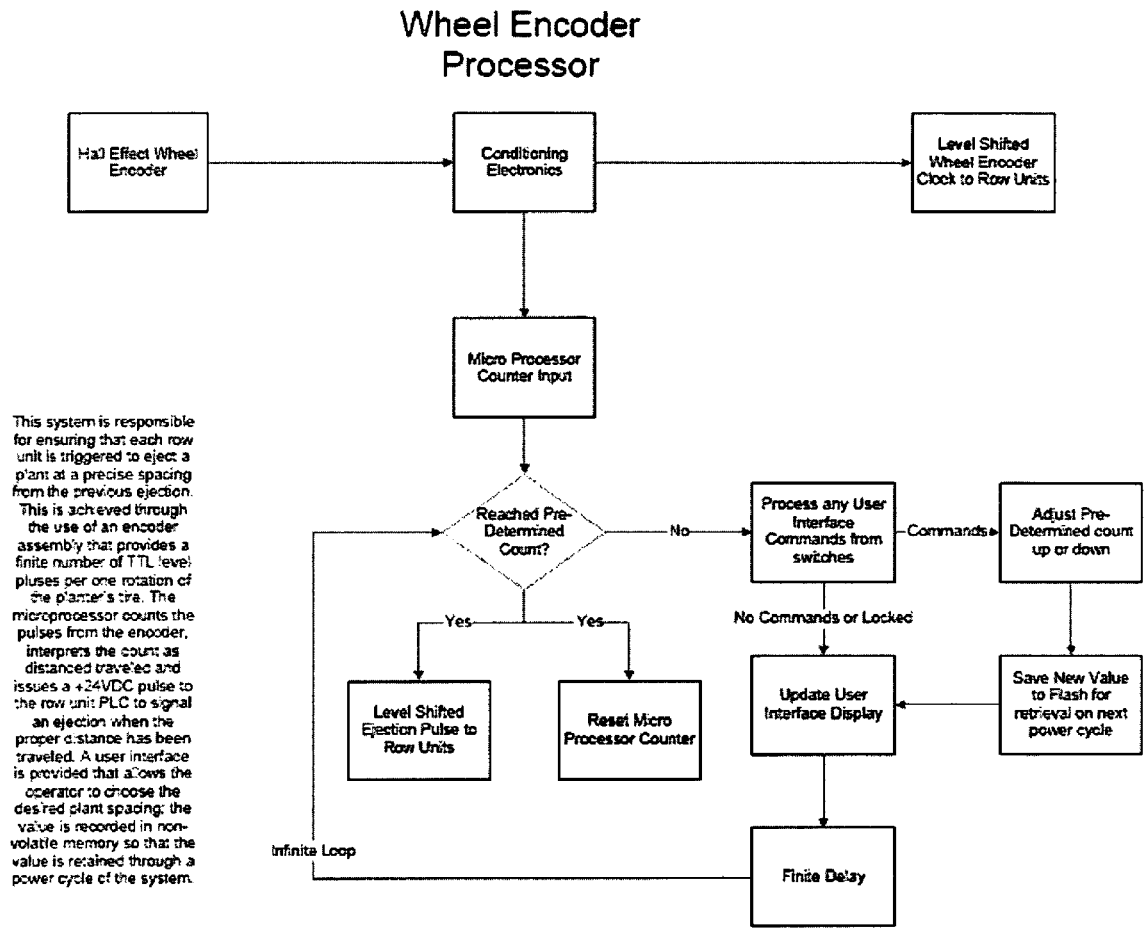

The flow chart of FIG. 34 sets forth the controls for the gate 510 which releases a single seedling at a time from the gap-up mechanism. The input trigger is responsive to an input signal received from the wheel encoder processor illustrated in FIG. 36, the gate 510 being operated in the same frequency as the gate 942. Thus, as shown in FIG. 35, the operation of the cut-off gate 680 is responsive to a PLC (or the equivalent) trigger input received from the wheel encoder processor, and after a finite delay, the gate cylinder 944 will be operated. The wheel encoder processor is responsive to a signal generated from a wheel encoder carried by a sensing wheel (not illustrated) which generates a distance signal as a function of the distance traveled by the transplanter.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A nursery tray indexing mechanism for use in a transplanter which discharges seedlings one at time to the ground with a desired spacing between the seedlings, which transplanter picks up an entire row of seedlings from a tray, which indexing mechanism is capable of receiving nursery trays of differing depths, widths, lengths and spacings between adjacent rows of cells, the indexing mechanism comprising:
spaced apart holding rails for slidably receiving and holding nursery trays;
means for indexing the tray a distance approximately the width of a nursery tray cell; and
means to finally position the tray by engaging a cell.

2. The nursery tray indexing mechanism as set forth in claim 1, wherein the means to finally position the tray is a V-shaped centering plunger which is forced into an empty cell adjacent the row of seedlings which is being picked up.

3. The nursery tray indexing mechanism as set forth in claim 2 wherein means are provided to adjust the V-shaped centering plunger from side to side.

4. The nursery tray indexing mechanism as set forth in claim 2 wherein the means for indexing the tray include means for moving the holding rails together to grasp the tray, and means to index the holding rails a distance approximately the width of a nursery tray cell, and further including means to release the means for moving the holding rails together when the V-shaped centering plunger is being forced into an empty cell.

* * * * *